(12) United States Patent
Kogure

(10) Patent No.: US 10,937,124 B2
(45) Date of Patent: Mar. 2, 2021

(54) INFORMATION PROCESSING DEVICE, SYSTEM, INFORMATION PROCESSING METHOD, AND STORAGE MEDIUM

(71) Applicant: CANON KABUSHIKI KAISHA, Tokyo (JP)

(72) Inventor: Kentaro Kogure, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 66 days.

(21) Appl. No.: 16/220,597

(22) Filed: Dec. 14, 2018

(65) Prior Publication Data

US 2019/0197660 A1    Jun. 27, 2019

(30) Foreign Application Priority Data

Dec. 25, 2017 (JP) .............................. JP2017-248013
Aug. 29, 2018 (JP) .............................. JP2018-160283

(51) Int. Cl.
*G06T 3/00* (2006.01)
*G06K 9/46* (2006.01)
(Continued)

(52) U.S. Cl.
CPC .......... *G06T 3/0018* (2013.01); *G06K 9/3233* (2013.01); *G06K 9/46* (2013.01);
(Continued)

(58) Field of Classification Search
CPC ............ G06K 9/3233; G06K 9/46; G06T 2207/20132; G06T 3/0018; G06T 5/006; H04N 5/23238; H04N 5/2628
See application file for complete search history.

(56) References Cited

U.S. PATENT DOCUMENTS 8,264,524 B1 *  9/2012  Davey ..................... H04N 7/18
                                                          348/36
2012/0093365 A1  4/2012  Aragane et al.
(Continued)

FOREIGN PATENT DOCUMENTS

JP    2015-222917 A    12/2015
JP    2017-126942 A     7/2017

OTHER PUBLICATIONS

Apr. 18, 2019 European Search Report in European Patent Appln. No. 18215256.1.
(Continued)

*Primary Examiner* — Ian L Lemieux
(74) *Attorney, Agent, or Firm* — Venable LLP

(57) ABSTRACT

An information processing device according to one embodiment of the present invention includes: a setting unit that sets a pattern used for outputting a partial image obtained from an omnidirectional image in accordance with the number and a position of at least one region of interest obtained from the omnidirectional image, which is a captured image captured by using a fisheye lens; an extract unit that, in accordance with a pattern set by the setting unit, cuts out a partial image including the region of interest from the omnidirectional image; a correction unit that performs a distortion correction process on the partial image cut out by the extract unit; and an output unit that, in accordance with the pattern set by the setting unit, outputs the partial image on which the distortion correction process has been performed by the correction unit.

17 Claims, 35 Drawing Sheets

(51) Int. Cl.
*G06T 5/00* (2006.01)
*G06K 9/32* (2006.01)
*H04N 5/232* (2006.01)
*H04N 5/262* (2006.01)

(52) U.S. Cl.
CPC ......... *G06T 5/006* (2013.01); *H04N 5/23238* (2013.01); *H04N 5/2628* (2013.01); *G06T 2207/20132* (2013.01)

(56) References Cited

U.S. PATENT DOCUMENTS

| | | |
|---|---|---|
| 2012/0249726 A1 | 10/2012 | Corcoran et al. |
| 2012/0257064 A1* | 10/2012 | Kim ................. G08B 13/19626 348/159 |
| 2014/0010474 A1* | 1/2014 | Lee ......................... G06T 5/006 382/275 |
| 2014/0184646 A1 | 7/2014 | Liu et al. |
| 2015/0049220 A1 | 2/2015 | Kuwata |
| 2015/0341569 A1 | 11/2015 | Takita et al. |
| 2016/0028951 A1* | 1/2016 | Mayuzumi ............... G02B 5/08 348/36 |
| 2017/0177926 A1 | 6/2017 | Takayama |
| 2017/0244943 A1* | 8/2017 | Saito ...................... G06F 3/0421 |
| 2017/0264832 A1 | 9/2017 | Yoshizawa et al. |
| 2019/0208142 A1* | 7/2019 | Kitaya ............... H04N 5/23293 |

OTHER PUBLICATIONS

Jan. 11, 2021 European Search Report in European Patent Appln. No. 18215256.1.

* cited by examiner

INFORMATION PROCESSING DEVICE, SYSTEM, INFORMATION PROCESSING METHOD, AND STORAGE MEDIUM

BACKGROUND OF THE INVENTION

Field of the Invention

The present invention relates to an information processing device, a system, an information processing method, and a storage medium.

Description of the Related Art

Conventionally, a fisheye camera on which a fisheye lens is mounted is widely used as one of the types of surveillance cameras. Since a view of 360 degrees can be monitored by a single fisheye camera, this results in reduction in the number of cameras and the cost thereof. Further, there is a camera that can output not only the omnidirectional image obtained from a fisheye camera without change but also an image or a video on which multiple types of cutout processes or distortion correction processes have been performed. In such a camera, also when various Video Content Analysis and the like such as human detection or moving-object detection are used, an image on which a cutout process and a distortion correction process have been performed is often used. Furthermore, such a camera can output a plurality of videos on which multiple types of cutout processes and distortion correction processes are performed and perform surveillance in accordance with a capturing environment or an installation environment.

However, it is necessary to set, via a user interface, a cutout process or a distortion correction scheme suitable for a capturing scene monitored by the user. Further, when the cutout process and the distortion correction scheme that have been set once are used, adaptation to a change in a capturing scene will be difficult. For example, Japanese Patent Application Laid-Open No. 2015-222917 discloses a method of detecting feature amounts of a plurality of images and switching a display device for each continuous display time in each designated image.

With respect to display by a captured image obtained by a fisheye camera, however, there is an increasing demand for display suitable for a capturing scene.

SUMMARY OF THE INVENTION

An information processing device of the present invention includes: a setting unit that sets a pattern used for outputting a partial image obtained from an omnidirectional image in accordance with the number and a position of at least one region of interest obtained from the omnidirectional image, which is a captured image captured through a fisheye lens; an extract unit that, in accordance with a pattern set by the setting unit, cuts out a partial image including the region of interest from the omnidirectional image; a correction unit that performs a distortion correction process on the partial image cut out by the extract unit; and an output unit that, in accordance with the pattern set by the setting unit, outputs the partial image on which the distortion correction process has been performed by the correction unit.

Further features of the present invention will become apparent from the following description of exemplary embodiments with reference to the attached drawings.

DESCRIPTION OF THE EMBODIMENTS

Embodiments of the present invention will be described below based on the drawings. A case where a camera is used as an image capturing apparatus will be described below.

First Embodiment

Figure 1:
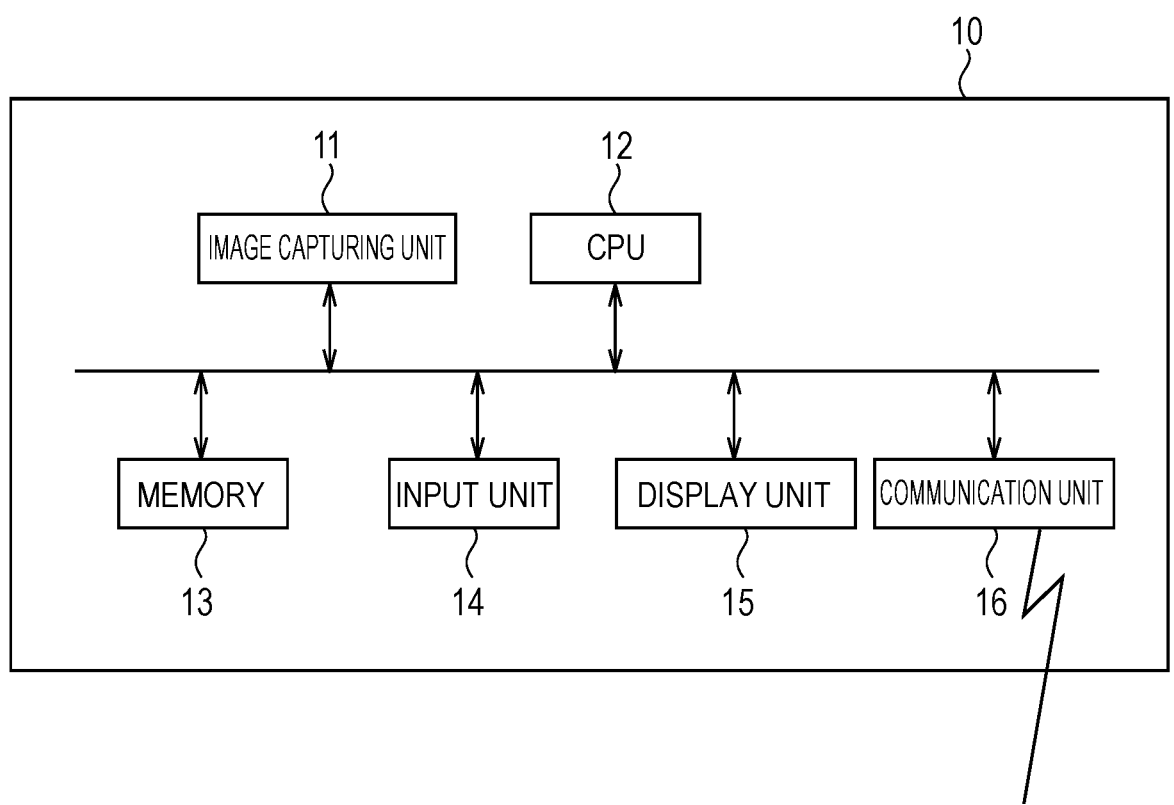
FIG. 1 is a diagram illustrating an example of a hardware configuration of a camera.
Figure 2:
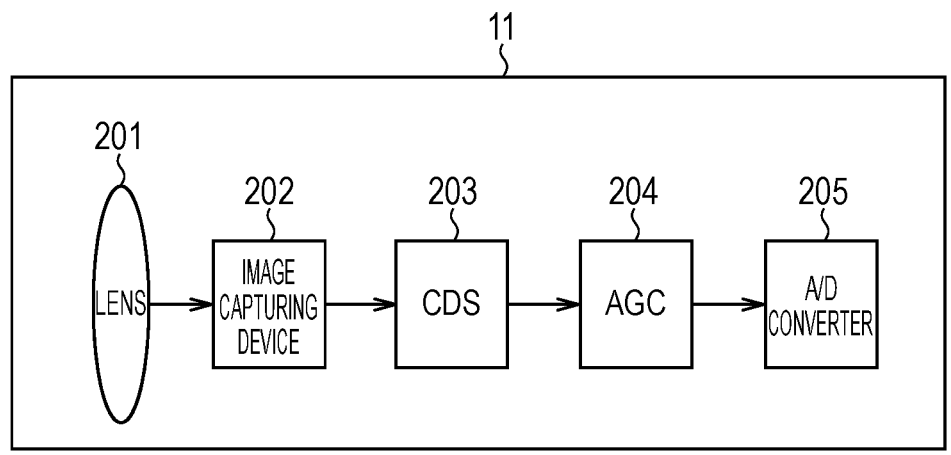
FIG. 2 is a diagram illustrating an example of an image capturing unit.

FIG. 1 is a diagram illustrating an example of the hardware configuration of a camera 10. The camera 10 is a fisheye camera. The camera 10 includes an image capturing unit 11, a CPU 12, a memory 13, an input unit 14, a display unit 15, and a communication unit 16 as a hardware configuration. The image capturing unit 11 captures a subject image. Details of the image capturing unit 11 are illustrated in FIG. 2 described later. The CPU 12 controls the entire camera 10. The memory 13 stores a program, an image captured by the image capturing unit 11, a setting value, or the like. The input unit 14 is input with a user selection operation or the like and hands it over to the CPU 12. The display unit 15 displays a screen or the like in accordance with the control of CPU 12. The communication unit 16 connects the camera 10 to a network and controls communication with other devices. When the CPU 12 performs a process in accordance with a program stored in the memory 13, a software configuration of the camera 10 illustrated in FIG. 3 described later and a process of a flowchart in FIG. 8 described later are implemented. The camera 10 is an example of an information processing device. It is also possible to apply the following embodiment to a recording server that accumulates omnidirectional images acquired from the camera 10 via a network or a terminal device used for displaying an omnidirectional image.

FIG. 2 is a diagram illustrating an example of the image capturing unit 11. The image capturing unit 11 includes a lens 201 formed of a group of several lenses and an image capturing device 202 such as CCD or CMOS. Further, the image capturing unit 11 has a correlated double sampling (CDS) circuit 203 that reduces noise. Further, the image capturing unit 11 includes a gain control amplifier circuit (automatic gain control (AGC)) 204 that automatically performs gain control of a camera. Further, the image capturing unit 11 includes an analog-to-digital (A/D) converter 205 that converts an analog signal to a digital signal.

Figure 3:
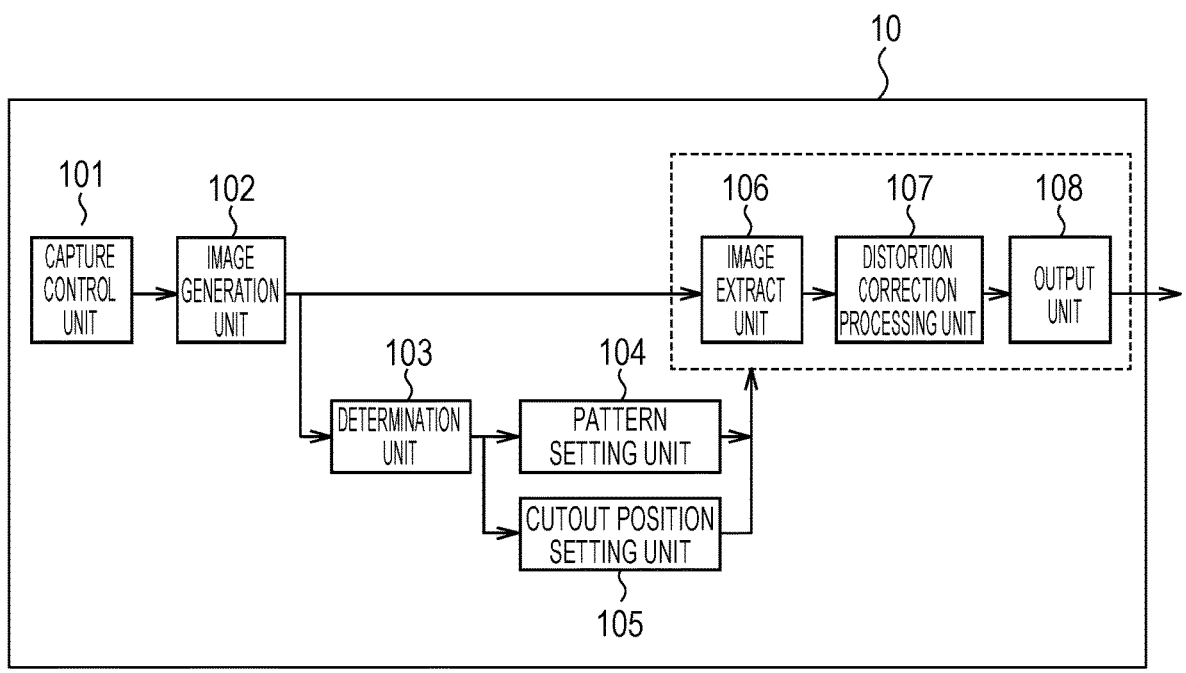
FIG. 3 is a diagram illustrating an example of a software configuration of a camera.

FIG. 3 is a diagram illustrating an example of a software configuration of the camera 10. A capture control unit 101 controls the image capturing unit 11 and hands over a signal from the image capturing unit 11 to an image generation unit 102. The image generation unit 102 generates a captured image in accordance with the received signal. A determination unit 103 determines a capturing scene from a captured image. A pattern setting unit 104 cuts out a partial image from a captured image and sets a pattern by which an image with further corrected distortion is arranged on an output image. An extract position setting unit 105 sets a cutout position of a captured image in accordance with the set pattern. An extract unit 106 cuts out an image at the cutout position set by the extract position setting unit 105. A distortion correction processing unit 107 performs distortion correction corresponding to the image cut out by the extract unit 106 and performs a process of arranging, as an output image, the image cut out in accordance with a pattern set by the pattern setting unit 104. An output unit 108 outputs an image signal on which distortion has been corrected by the distortion correction processing unit 107.

The operation of each of the above components will be described in detail.

First, the image capturing apparatus will be described in detail by using FIG. 2 and FIG. 3. The image capturing device 202 converts a subject image captured via the lens 201 as an imaging optical system into an electrical signal. The lens 201 may be a wide-angle lens or a fisheye lens having large distortion and a wide image angle. In the present embodiment, a case of a fisheye camera in which a fisheye lens is provided as an image capturing apparatus will be described. The CDS circuit 203 performs a double correlated sampling process or the like on an electric signal output from the image capturing device 202. The AGC amplifier 204 performs an amplification process or the like on an electric signal output from the CDS circuit 203. The A/D converter 205 converts an analog signal amplified by the AGC amplifier 204 into a digital signal.

The capture control unit 101 hands over a luminance signal and a color signal obtained from the image capturing unit 11 to the image generation unit 102. The image generation unit 102 generates an image signal such as an RGB image or a YUV image from the obtained luminance signal and color signal. The determination unit 103 determines the number of regions of interest and the position of the region of interest from the image generated by the image generation unit 102. The pattern setting unit 104 sets a pattern based on the number and the position (or the distribution) of regions of interest within the image determined by the determination unit 103. The extract position setting unit 105 sets a position from which the region of interest within the image determined by the determination unit 103 is cut out correspondingly to the pattern set by the pattern setting unit 104. At this time, a cutout position such that a region of interest is not divided is set. The extract unit 106 uses the cutout position set by the extract position setting unit 105 to cut out a partial image from the image generated by the image generation unit 102. The distortion correction processing unit 107 performs a distortion correction process, such as various geometric conversion, on the image cut out by the extract unit 106. The distortion correction processing unit 107 then performs a process of arranging a distortion-corrected image as an output image in accordance with the pattern set by the pattern setting unit 104.

Figure 4:
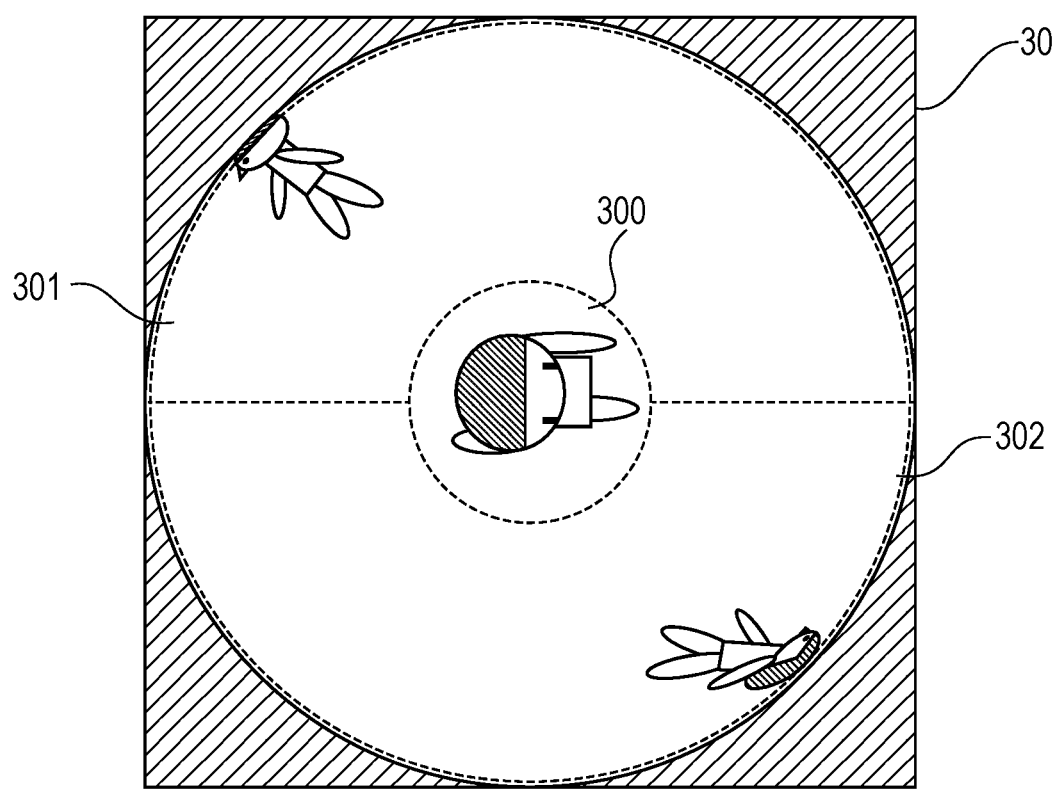
FIG. 4 is a diagram illustrating an example of a captured image.
Figure 5:
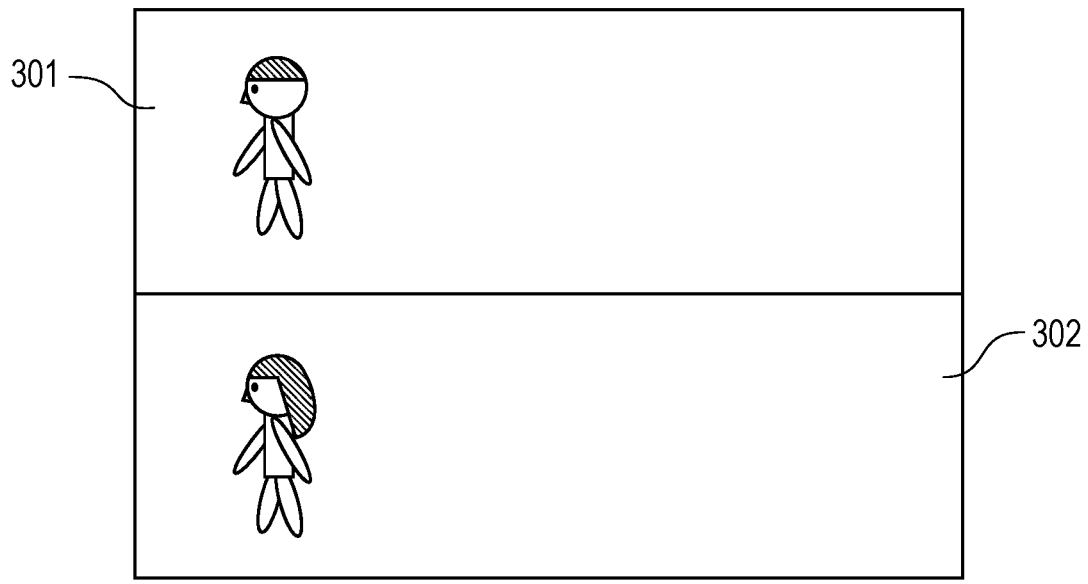
FIG. 5 is a diagram illustrating an example of an image output by an output unit.

An image on which a cutout process is performed by the extract unit 106 and an image on which a distortion correction process is performed by the distortion correction processing unit 107 will now be described by using FIG. 4 to FIG. 7. An omnidirectional image 30 in FIG. 4 is an example of an image obtained by capturing a direction perpendicular to a floor by using a fisheye camera having a fisheye lens installed on an indoor ceiling. In the omnidirectional image 30 in FIG. 4, the extract unit 106 cuts out a region 301 and a region 302 partitioned by dashed lines, respectively, except for a region 300 partitioned by a dashed line. FIG. 5 illustrates an example of an output image obtained after a distortion correction process is performed on the regions 301 and 302 by the distortion correction processing unit 107 and the region 302 is vertically inverted and connected to the region 301.

Figure 6:
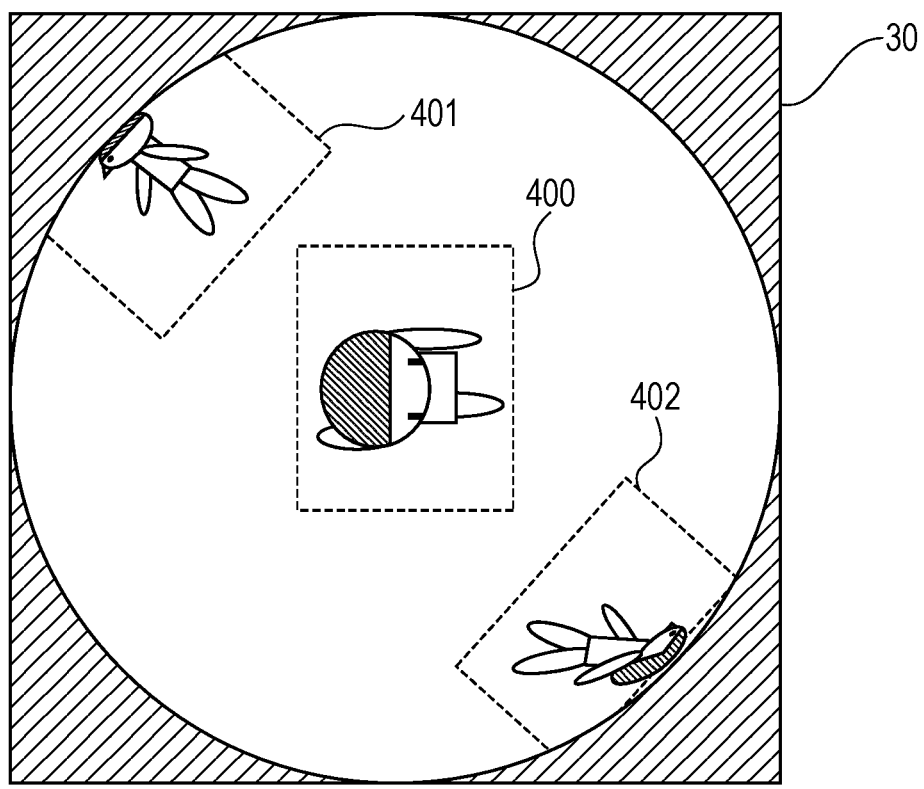
FIG. 6 is a diagram illustrating an example of a captured image.
Figure 7:
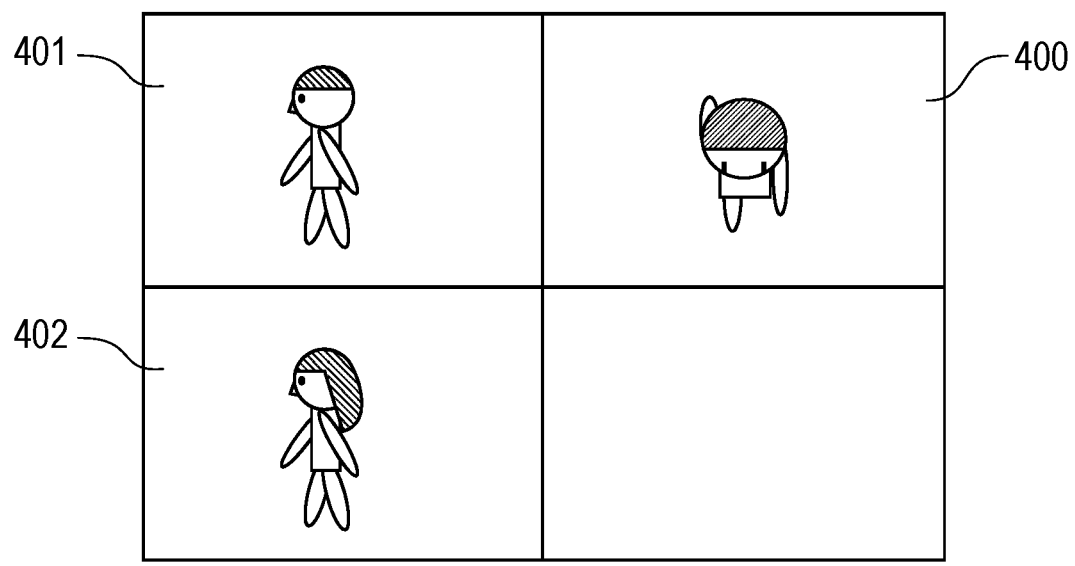
FIG. 7 is a diagram illustrating an example of an image output by the output unit.

FIG. 4 is an example in which the region 300 is identified as an ineffective region and is not used as an output image, and the regions 301 and 302 in which the region of interest is included are identified as an effective region and used as an output image. Furthermore, as illustrated in FIG. 6, there may be another example in which the extract unit 106 partially cuts out regions 400 to 402 that are the region of interest and the distortion correction processing unit 107 performs a distortion correction process. Images output after a distortion correction process is performed on the cutout regions 400 to 402 illustrated in FIG. 6 are arranged in the regions 400 to 402 in FIG. 7.

In the example of FIG. 6, images of the regions 400 to 402 in FIG. 6 are identified as an effective region and used as an output image, and the other region is identified as an ineffective region and not used as an output image. Note that the output unit 108 may synthesize three partial images to output a single image or may output these three partial images as a plurality of streams. Similarly, in a case of four or more partial images, after being scaled in accordance with the size of an image output by the output unit 108, respective cutout images may be synthesized and output or may be output as a plurality of streams, for example. The output unit 108 outputs an image signal on which a distortion correction process has been performed by the distortion correction processing unit 107. An image signal may be output to a display built in the camera 10 or an external terminal device connected to a network via the communication unit 16.

An example when the camera 10 sets a pattern and a cutout position used for outputting an image in accordance with a condition of a region of interest in a captured image will be described by using the flowchart of FIG. 8.

In step S101, the determination unit 103 acquires an image generated by the image generation unit 102. This image is an omnidirectional image acquired before a distortion correction process is performed. Next, in step S102, the determination unit 103 extracts a region of interest from the omnidirectional image acquired before a distortion correction process is performed.

Next, in step S103, the determination unit 103 determines whether or not there is one or more regions of interest. The determination unit 103 may calculate a distribution of faces or persons within an image and determine, as a region of interest, a region in which the number of faces or persons within an image is greater than a set number or determine, as a region of interest, a region in which the density is higher than a set value. Further, the determination unit 103 may calculate a remaining degree or a traffic line density of faces or persons from a single image or may calculate a remaining degree or a traffic line density of faces or persons from multiple images. Note that, when detecting a face or a person by using pattern matching, it is necessary to detect a face or a person for an image on which distortion correction is once performed. Further, the determination unit 103 may simplify analysis and count the number of the foreground regions having a size greater than a predetermined size. In the present embodiment, the determination unit 103 determines, as a region of interest, a region in which the number of persons located within a region having a predetermined size is greater than or equal to a predetermined number (for example, three) for a peripheral region within an omnidirectional image obtained before a distortion correction process is performed.

On the other hand, the determination unit 103 determines, as a region of interest, a region in which one or more persons are located within a region having the set size with respect to the center region within the omnidirectional image obtained before a distortion correction process is performed. This is because a person located at the center is captured to be larger than that located at the periphery in an image obtained before a distortion correction process is performed. The set size of the region described above may be determined in advance as an occupancy ratio to the entire image and stored in the memory 13 or may be stored in the memory 13 or the like in accordance with a user operation via the input unit 14 or the like. The determination unit 103 proceeds to step S104 if no region of interest is present in an image (S103, No) and proceeds to step S105 if one or more region of interest are present in an image (S103, Yes).

In step S104, the pattern setting unit 104 sets a pattern which is set by the user in advance. Further, the extract position setting unit 105 sets a cutout position corresponding to the pattern. In this example, a pattern set by the user in advance may be any one of pattern 1, pattern 2, and pattern 3 or may be an omnidirectional image before cutout. In the present embodiment, an omnidirectional image before cutout by which the entire image can be overlooked is used as a pattern set by the user in advance, and this omnidirectional image is output. In step S105, the determination unit 103 determines whether or not two or more regions of interest are present. The determination unit 103 proceeds to step S106 if two or more regions of interest are not present (S105, No) and proceeds to step S107 if two or more regions of interest are present (S105, Yes).

In step S106, the pattern setting unit 104 sets pattern 1 that does not output divided images and outputs a single image in order to support a single region of interest. Further, the extract position setting unit 105 sets a cutout position such that a single region of interest is included so as to support the set pattern 1.

In step S107, the determination unit 103 determines whether or not three or more regions of interest are present. The determination unit 103 proceeds to step S108 if three or more regions of interest are not present (S107, No) and proceeds to step S109 if three or more regions of interest are present (S107, Yes). In step S108, the pattern setting unit 104 sets pattern 2 that generates and outputs two-window-divided image (double panorama) in order to support two regions of interest. Further, the extract position setting unit 105 sets cutout positions such that each of detected regions of interest is not divided so as to support the set pattern 2. In step S109, the pattern setting unit 104 sets pattern 3 that generates and outputs four-window-divided image in order to support three or more regions of interest. Further, the extract position setting unit 105 cuts out regions of interest so as to support the set pattern.

Figure 9:
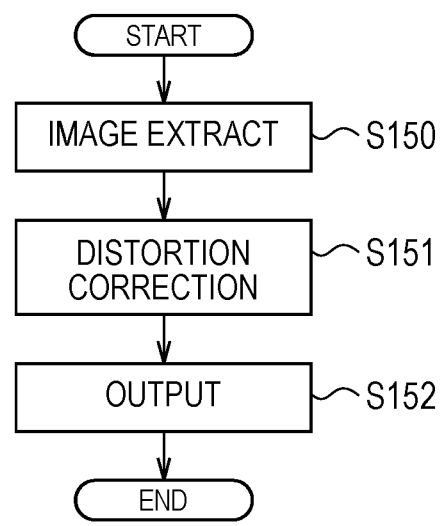
FIG. 9 is a flowchart illustrating an example of information processing in the camera.

An example in which an image is cut out in accordance with the pattern and the cutout position set by the camera 10, distortion correction is performed thereon, and the resulted image is output will be described by using the flowchart of FIG. 9.

In step S150, the extract unit 106 cuts out a region of interest from a captured image in accordance with the pattern set by the pattern setting unit 104 and the position set by the extract position setting unit 105. In the example of the pattern 1 and the cutout position set in step S106, the extract unit 106 cuts out a region of interest 501 located in a single left-upper part surrounded by the dashed line from the entire image in FIG. 10. Further, in the example of pattern 2 and the cutout position set in step S108, the extract unit 106 cuts out, from the entire image in FIG. 12, a partial image from two semicircle regions 601 and 602 obtained by excluding an ineffective region at the center surrounded by dashed line. That is, a cutout position is set so that a region of interest is included in each of the two cutout images. Further, in the example of pattern 3 and the cutout position set in step S109, the extract unit 106 cuts out three regions of interest 701, 702, and 703 surrounded by the dashed line from the entire image in FIG. 14.

In step S151, the distortion correction processing unit 107 performs a distortion correction process on the image cut out in step S150. For example, the distortion correction processing unit 107 performs a distortion correction process in accordance with a pattern when the pattern is pattern 1 or pattern 3. Further, for example, the distortion correction processing unit 107 performs a distortion correction process in accordance with a pattern and a cutout position when the set pattern is pattern 2. A distortion correction process as used herein is a process such as scaling up or down or geometric conversion of an image, for example.

Figure 10:
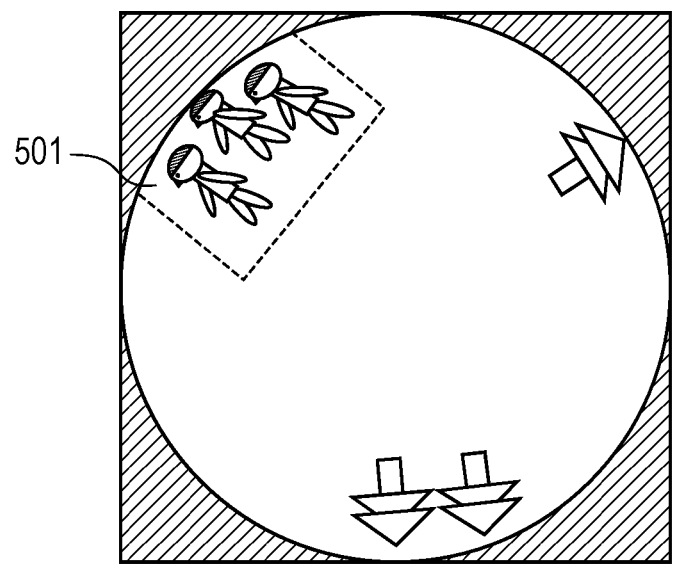
FIG. 10 is a diagram illustrating an example of pattern 1.
Figure 11:
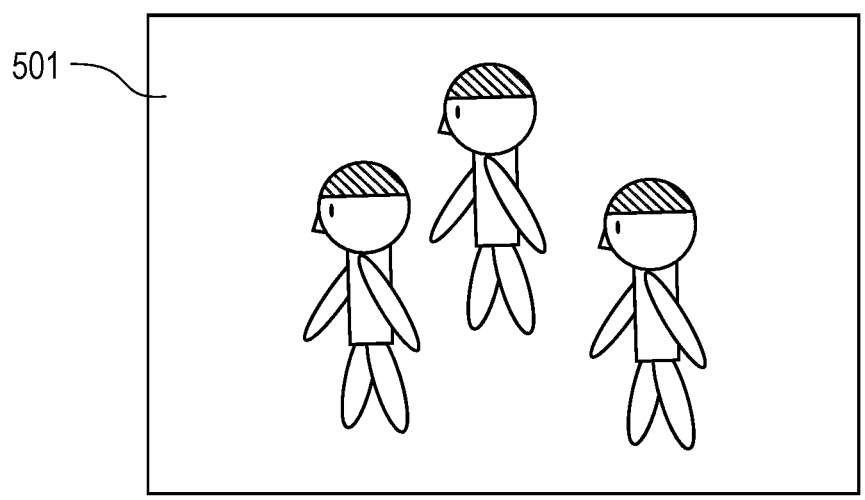
FIG. 11 is a diagram illustrating an example of an image on which a distortion correction process has been performed.
Figure 12:
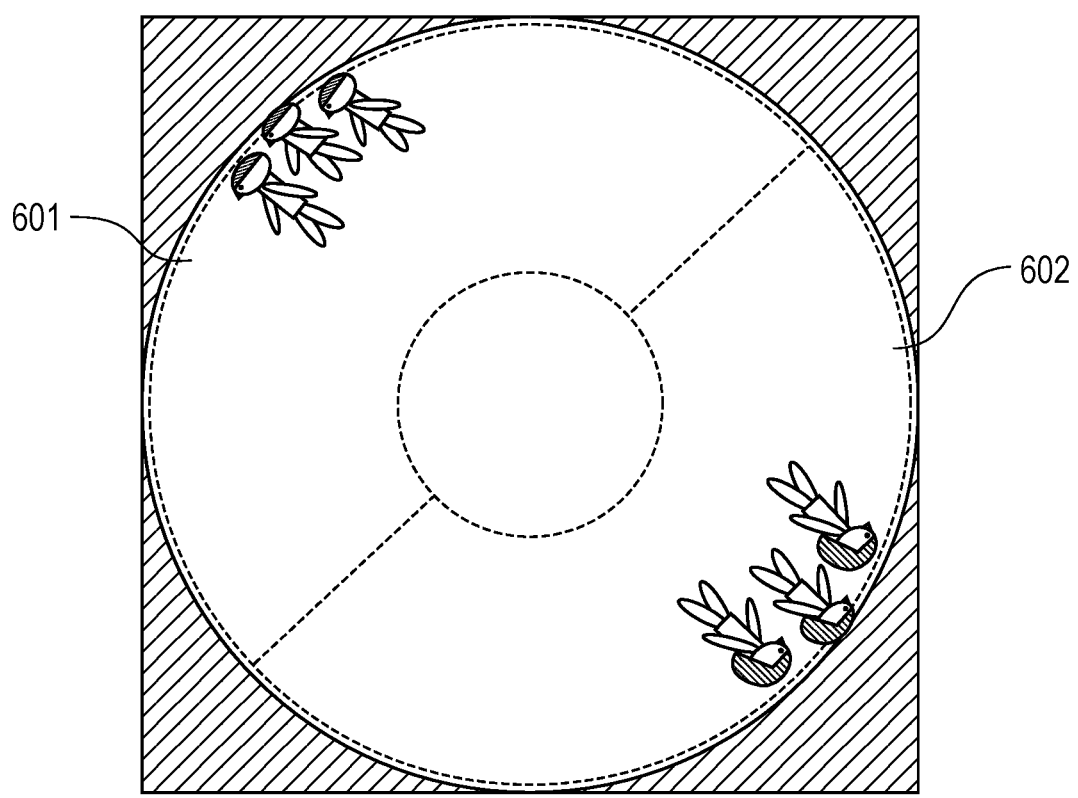
FIG. 12 is a diagram illustrating an example of pattern 2.

In step S152, the output unit 108 outputs an image on which a distortion correction process is performed in step S151. FIG. 11 is a diagram illustrating an example in which the image of the region of interest 501 in FIG. 10 is cut out in accordance with the setting in step S106, a distortion correction process is performed thereon, and the resulted image is output to a client device 20 illustrated in FIG. 17 described later. Further, FIG. 13 is a diagram illustrating an example in which the regions 601 and 602 in FIG. 12 are cut out in accordance with the setting in step S106, a distortion correction process is performed thereon, and the resulted image is output.

Figure 13:
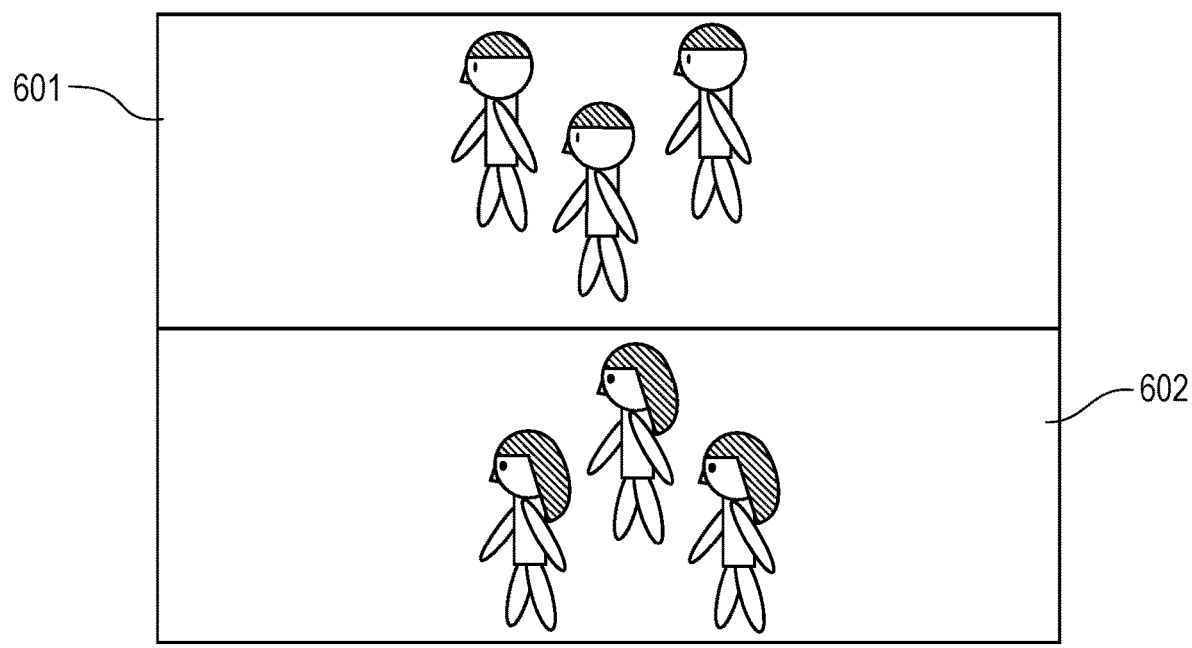
FIG. 13 is a diagram illustrating an example of an image on which a distortion correction process has been performed.
Figure 14:
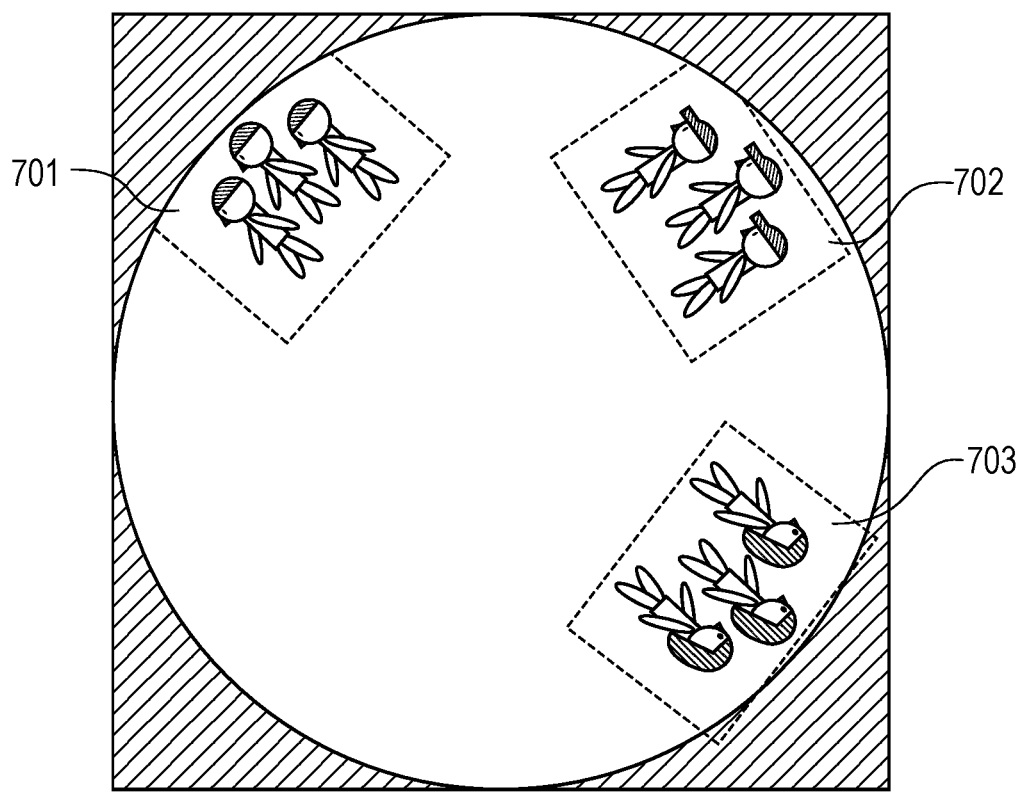
FIG. 14 is a diagram illustrating an example of pattern 3.
Figure 15:
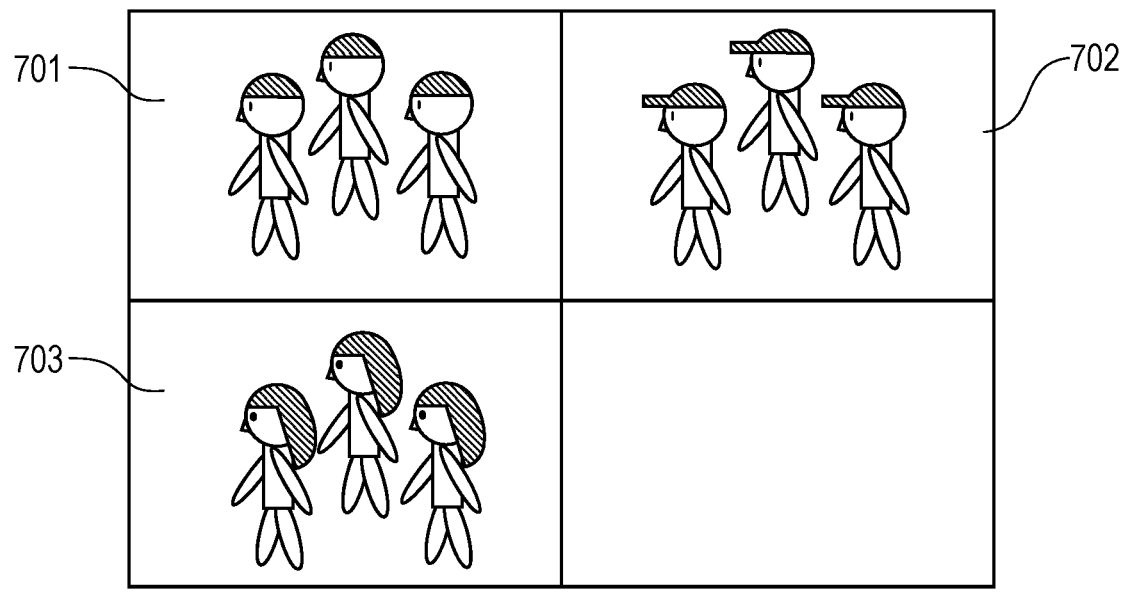
FIG. 15 is a diagram illustrating an example of an image on which a distortion correction process has been performed.
Figure 16:
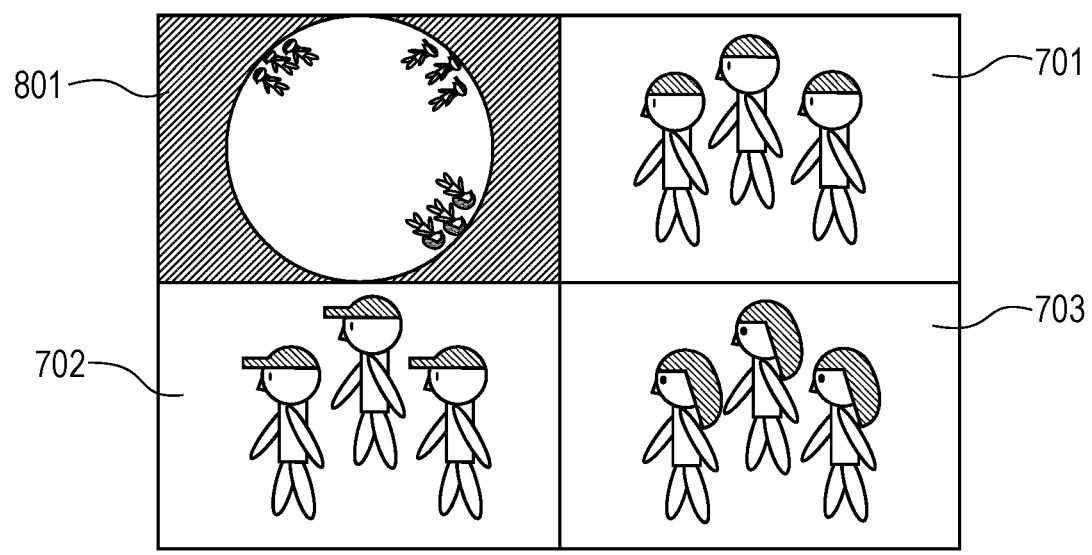
FIG. 16 is a diagram illustrating an example of an image output by the output unit.

As illustrated in FIG. 13, a two-window-divided image called double panorama is output for the pattern 2. Further, FIG. 15 is a diagram illustrating an example in which the regions of interest 701, 702, and 703 in FIG. 14 are cut out in accordance with the setting of step S109, a distortion correction process is performed thereon, and the resulted image is output. That is, four-window-divided image is output for the pattern 3. Note that a vacant region occurs when the pattern 3 is selected and only three regions of interest are present. In this case, the output unit 108 may rearrange the cutout images 701, 702, and 703 as seen in the image in FIG. 16 and scale down and output the omnidirectional image, which is the captured image as indicated by 801 in FIG. 16 to the vacant region. Such an omnidirectional image is effective when five or more regions of interest are present.

Figure 8:
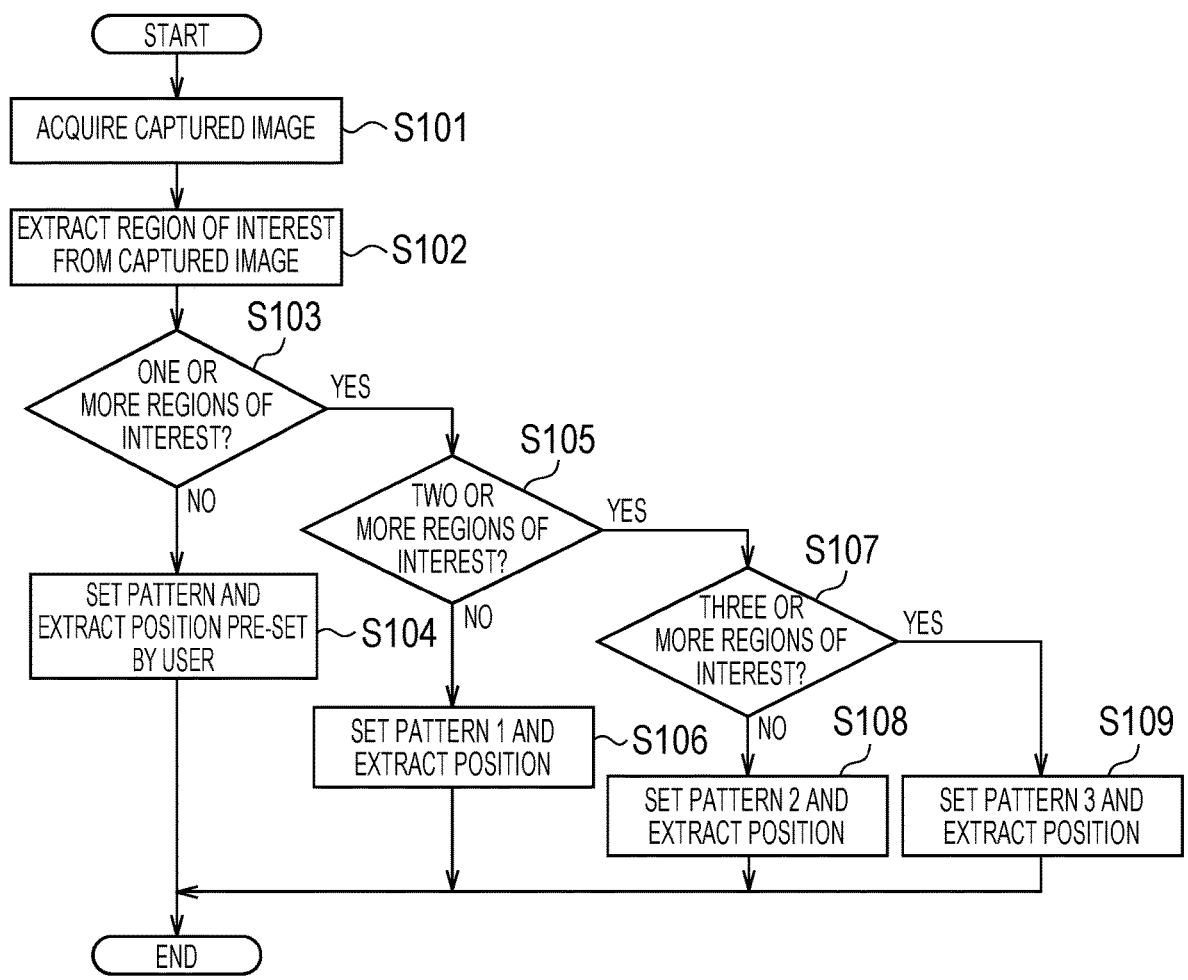
FIG. 8 is a flowchart illustrating an example of information processing in a camera.

Note that the pattern 3 is selected when three or more regions of interest are present in the flowchart illustrated in FIG. 8. When five or more regions of interest are present and when each region of interest is allocated to the corresponding divided image, one or more regions of interest that are unable to be output may occur. In the present embodiment, when five or more regions of interest are present, adjacent regions of interest may be grouped to create four groups. Further, when five or more regions of interest are present or when regions of interest overlap with each other and the optimum cutout position cannot be set, the omnidirectional image obtained before a distortion correction is performed may be output so as to be able to overlook the entirety without outputting a partial image.

Each pattern of the present embodiment is an example for cutout time. Other patterns that are different in the cutout number and the cutout position may be used. Further, a change timing of respective patterns may be reflected immediately to the determination result of the determination unit 103, may occur at a predetermined constant interval, or may be changed by the user at will. A distortion correction process is performed by the distortion correction processing unit 107 on the cutout image, and the image is output from the output unit 108.

As described above, according to the process of the present embodiment, it is possible to prevent a region of interest (subject of interest) from being cut due to an image cutout operation. Further, an image on which suitable cutout process and distortion correction process are performed in accordance with a capturing scene or the like can be output without requiring setting by the user. Therefore, since a pattern and a distortion correction process of an image are appropriately changed in accordance with a capturing scene or the like, an image suitable for surveillance can be provided.

Second Embodiment

Figure 17:
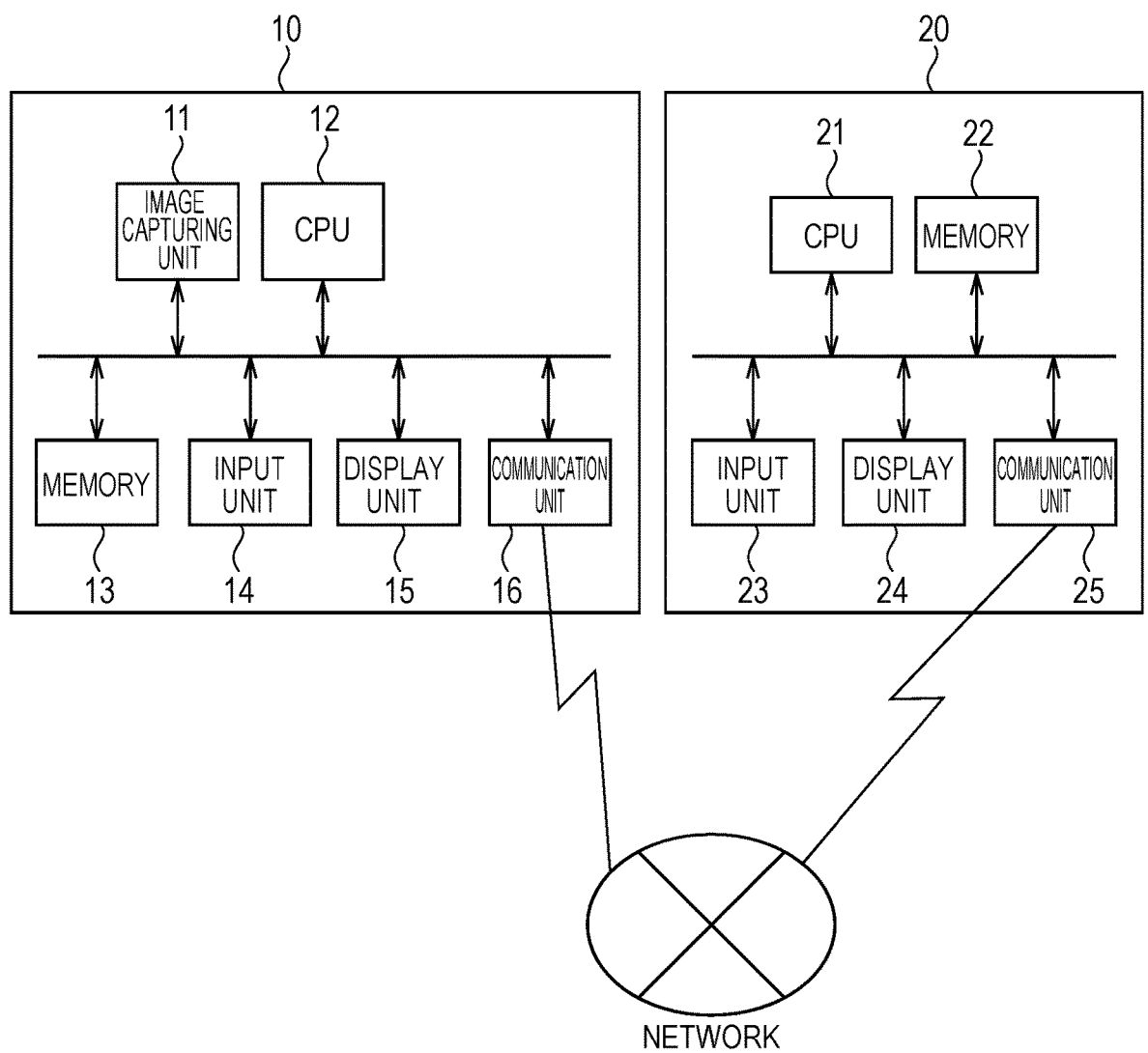
FIG. 17 is a diagram illustrating an example of a hardware configuration of a device forming an imaging system.

FIG. 17 is a diagram illustrating an example of a hardware configuration of a device forming an imaging system. In the imaging system, the camera 10 and the client device 20 are connected via a network so as to be able to communicate with each other. The network may be a wired network or a wireless network. The hardware configuration of the camera 10 is the same as that in the first embodiment. When the CPU 12 performs a process in accordance with a program stored in the memory 13, the software configuration or the like of the camera 10 illustrated in FIG. 18 described later is implemented. The client device 20 includes a CPU 21, a memory 22, an input unit 23, a display unit 24, and a communication unit 25 as a hardware configuration. The CPU 21 controls the entire client device 20. The memory 22 stores a program, an image transmitted from the camera 10, a setting value, or the like. The input unit 23 is input with a user selection operation or the like and hands it over to the CPU 21. The display unit 24 displays a window or the like in accordance with the control by the CPU 21. The communication unit 25 connects the client device 20 to the network and controls communication with another device (for example, the camera 10) or the like. When the CPU 21 performs a process in accordance with a program stored in the memory 22, the software configuration of the client device 20 illustrated in FIG. 18 described later and the process of the flowchart in FIG. 19 described later are implemented. The client device 20 is an example of an information processing device.

Figure 18:
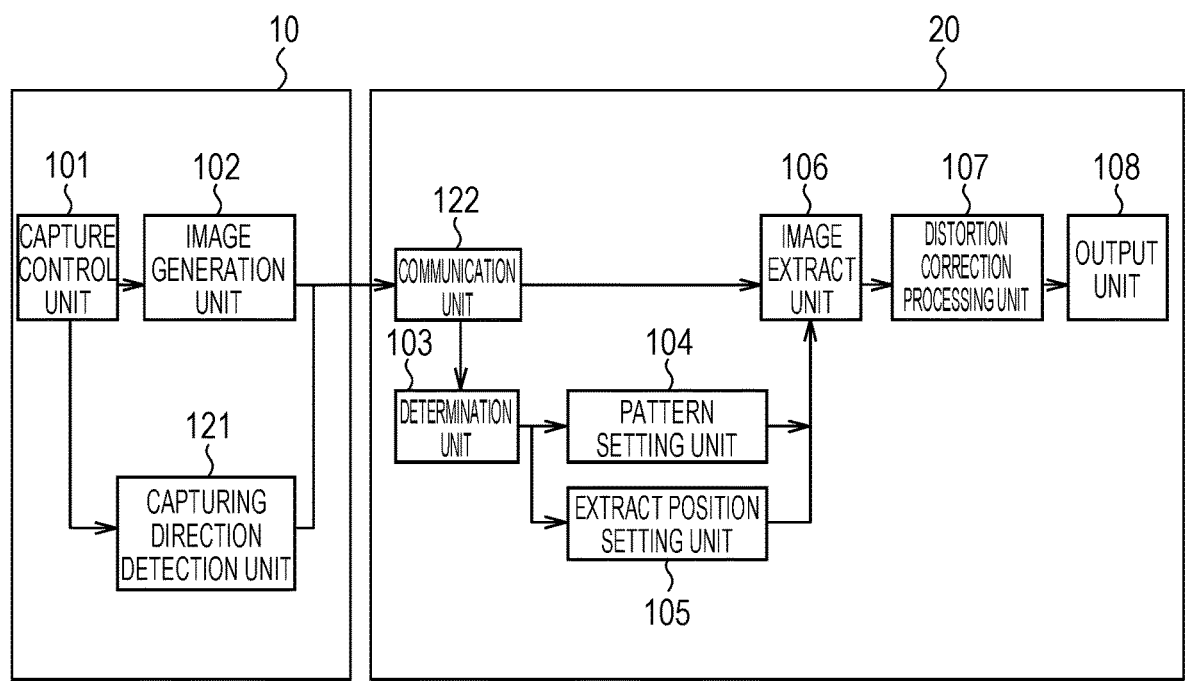
FIG. 18 is a diagram illustrating an example of a software configuration of the device forming the imaging system.

FIG. 18 is a diagram illustrating an example of the software configuration of the device forming the imaging system. Since the image capturing unit 11 and the image generation unit 102 of the camera 10 have the same configuration as those in the first embodiment, the description thereof will be omitted. A capturing direction detection unit 121 detects a capturing direction of the image capturing unit 11. For example, the capturing direction detection unit 121 may acquire a capturing angle from the output of a gyro sensor. Since the determination unit 103, the pattern setting unit 104, the extract position setting unit 105, the extract unit 106, the distortion correction processing unit 107, and the output unit 108 of the client device 20 have the same configuration as the camera 10 in the first embodiment, the description thereof will be omitted. A communication processing unit 122 communicates with the camera 10 and receives an image generated by the image generation unit 102 and a capturing direction detected by the capturing direction detection unit 121.

Figure 19:
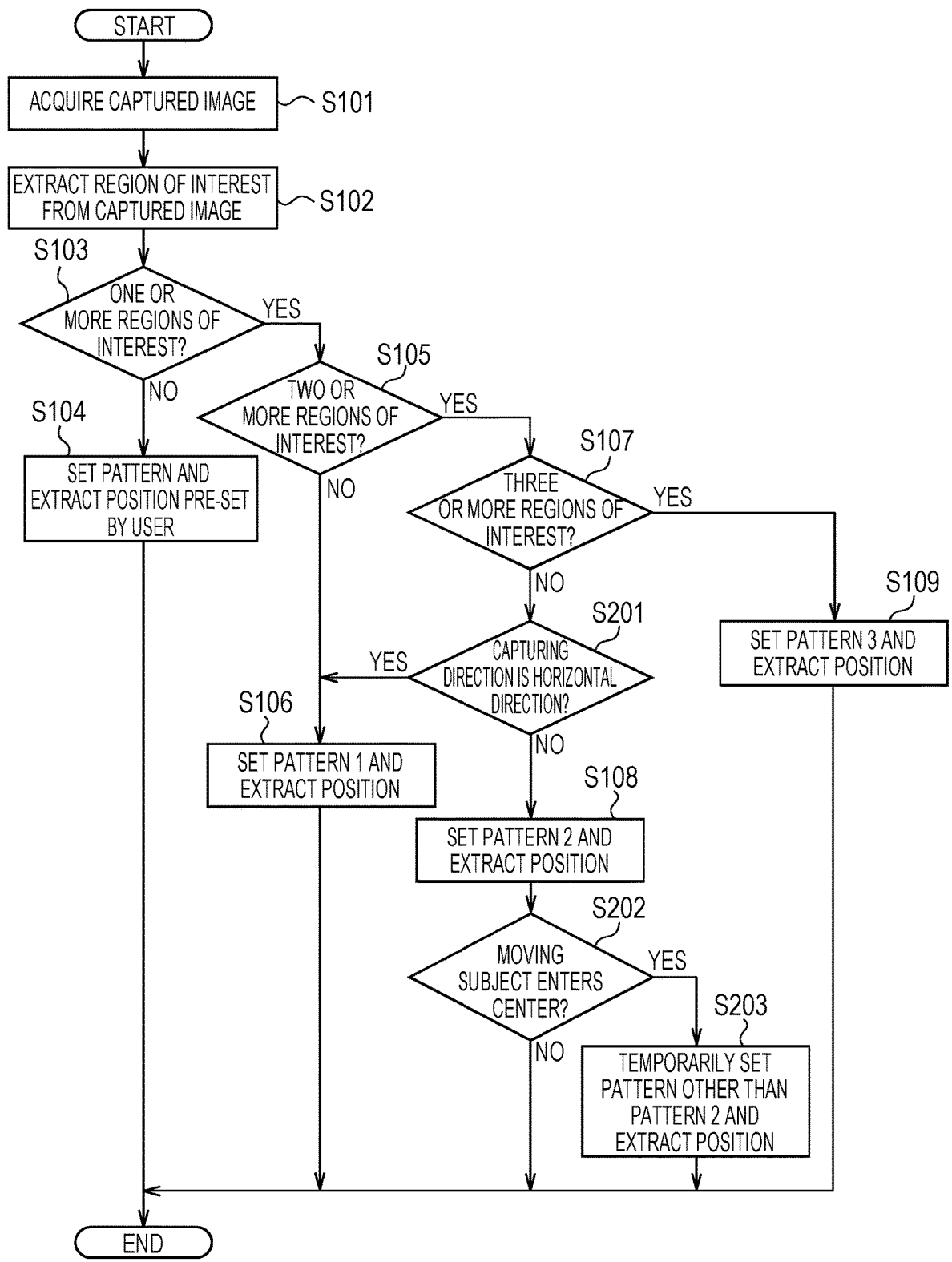
FIG. 19 is a flowchart illustrating an example of information processing in a client device.

Next, an example when the imaging system including the camera 10 and the client device 20 sets and outputs a pattern and a cutout position of an image in accordance with a condition of the region of interest in a captured image will be described by using the flowchart illustrated in FIG. 19. Since steps S101 to S109 of the flowchart in FIG. 19 are of the same process content and the same process flow as respective steps in the first embodiment, the description thereof will be omitted. Further, since the patterns or the like in FIG. 10 to FIG. 15 are related to the same process content as those in the first embodiment, the description thereof will be omitted.

In step S201, the determination unit 103 determines whether or not the capturing direction of the image capturing unit 11 is the horizontal direction in accordance with the capturing direction of the image capturing unit 11 that is detected by the capturing direction detection unit 121 and received via the communication processing unit 122. In this step, the capturing direction being the horizontal direction corresponds to a case such as where the camera 10 is installed on a wall face, for example, otherwise a case such as where the camera 10 is installed to the ceiling and captures the vertical direction. The determination unit 103 proceeds to step S106 when determining that the capturing direction is the horizontal direction and proceeds to step S108 when determining that the capturing direction is not the horizontal direction. In the case of the pattern 2, a cutout process and a distortion correction process are performed on the peripheral image excluding the center part of the entire image. Therefore, when the capturing direction is the horizontal direction, the pattern setting unit 104 sets the pattern 1 in step S106. Further, the extract position setting unit 105 sets a cutout position that cuts out a single partial image so as to include two regions of interest to support the set pattern 1. At this time, since it is considered that the regions of interest appear at the center part excluding the upper and under regions of the omnidirectional image, a cutout position is set so as to cut out the center part of the omnidirectional image. On the other hand, when the image capturing unit 11 is not oriented in horizontal direction, that is, for example, oriented in the vertical direction, the pattern setting unit 104 sets the pattern 2 in step S108. Further, the extract position setting unit 105 sets the cutout position so that each region of interest is included in the two cutout partial images to support the set pattern 2.

Figure 20:
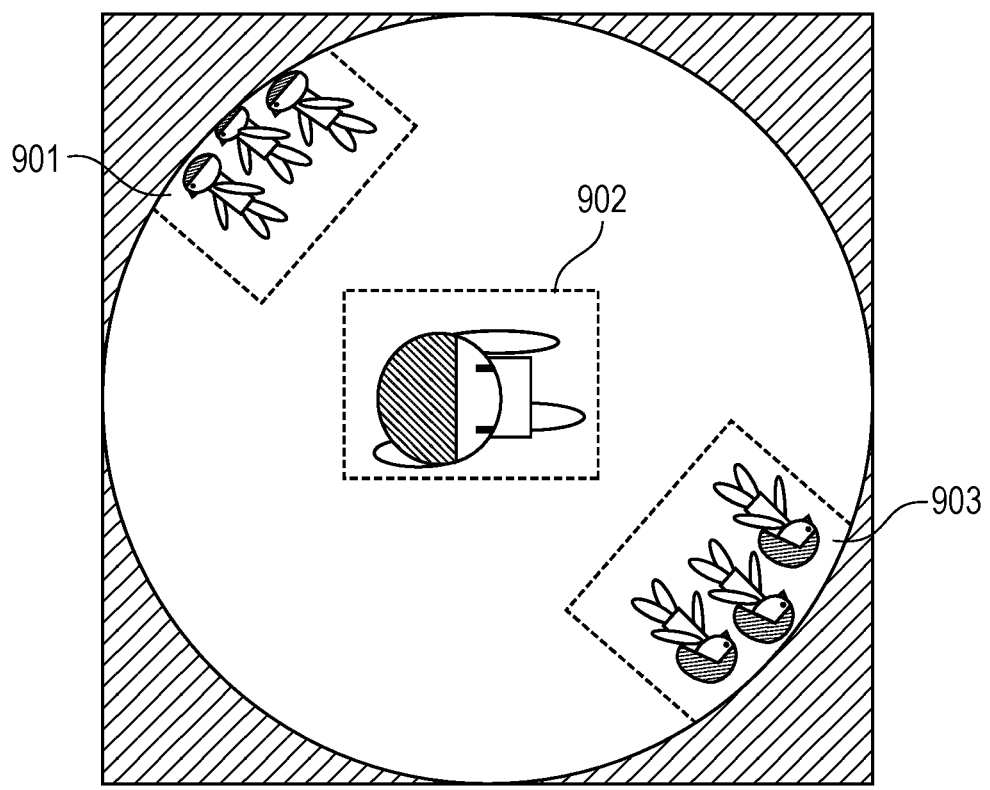
FIG. 20 is a diagram illustrating an example of a captured image.

In step S202, the determination unit 103 determines whether or not a region of interest such as a particular moving object appears at the center part of the entire image as illustrated in FIG. 20. The determination unit 103 proceeds to step S203 if a region of interest such as a particular moving object appears at the center part of the entire image (S202, Yes) and ends the process of the flowchart in FIG. 19 if no region of interest such as a particular moving object appears at the center part of the entire image (S202, No).

Figure 21:
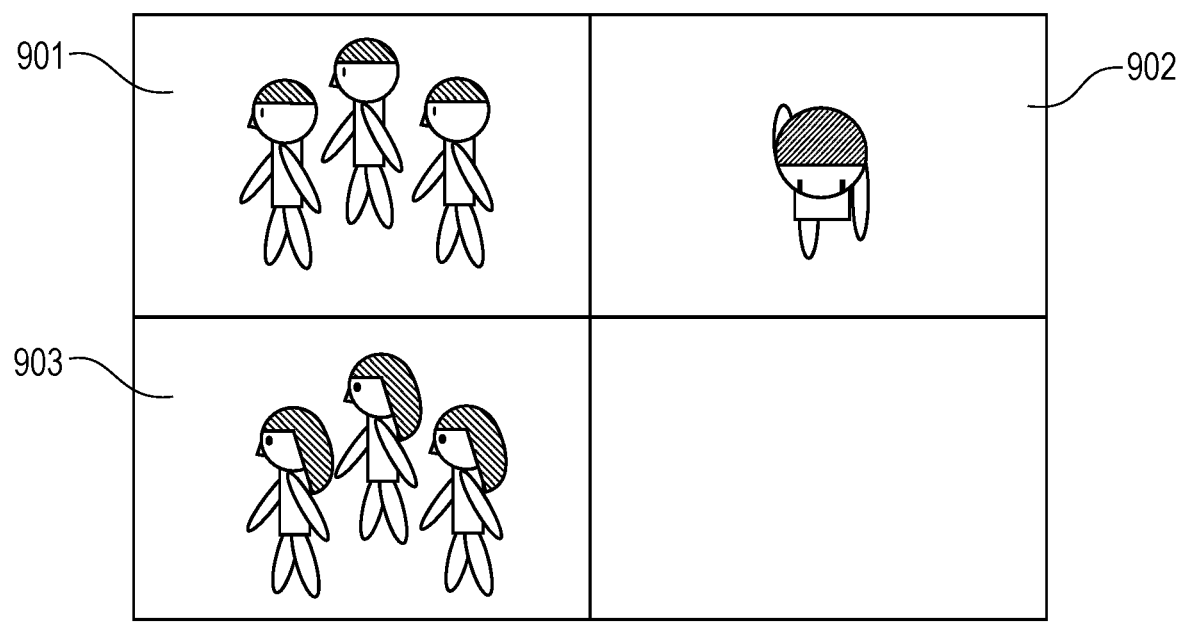
FIG. 21 is a diagram illustrating an example of a pattern other than pattern 2.

In step S203, the pattern setting unit 104 temporarily sets a pattern other than the pattern 2, for example, the pattern 3 as illustrated in FIG. 21. Further, the extract position setting unit 105 sets the position from which three partial images are cut out so that the regions of interest are included, respectively, in accordance with the set pattern 3. In this example, the determination unit 103 may recognize a particular subject as a particular moving object by using face recognition or the like or may recognize a particular subject as a particular moving object when the size or the speed of a moving object exceeds a threshold determined in advance or a threshold set by the user. Further, the center part of an image refers to a region within a range set from the center of the image, for example. The pattern 2 is an example of the first pattern. The process of step S203 is an example of a process of setting a pattern other than the first pattern.

As described above, according to the process of the present embodiment, it is possible to provide an image suitable for surveillance of a particular moving object in addition to provide the advantage of the first embodiment.

Third Embodiment

In a third embodiment, an example different from the first and second embodiments will be described in which a pattern and a cutout position corresponding to the pattern are set in accordance with a condition of the region of interest in a captured image. Since the hardware configuration and the software configuration of the camera 10 and the client device 20 are the same as those in the embodiments described above, the description thereof will be omitted. When the CPU 21 performs a process in accordance with a program stored in the memory 22, the process of the flowchart illustrated in FIG. 22 described later is implemented.

Figure 22:
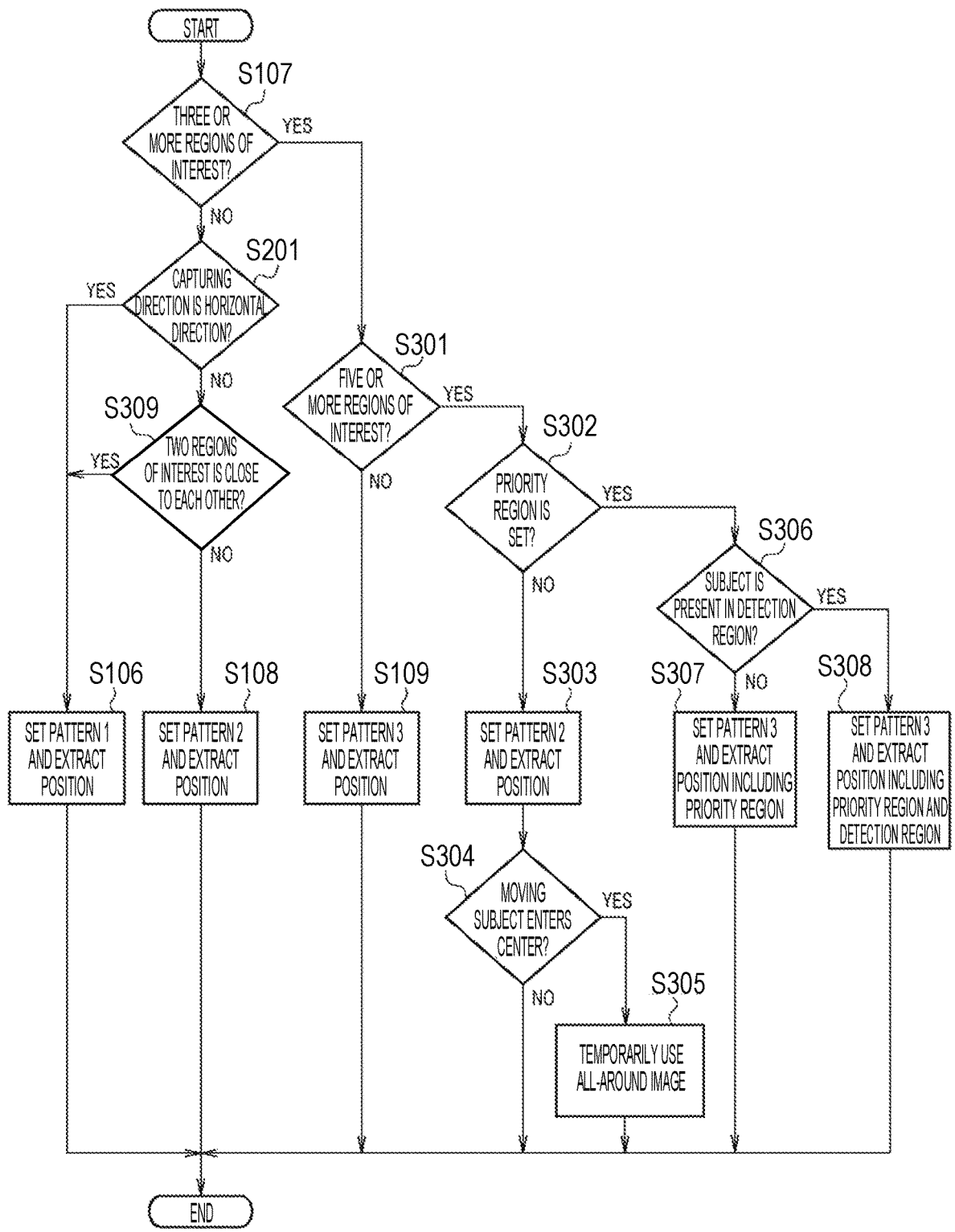
FIG. 22 is a flowchart illustrating an example of information processing of a client device.

Next, an example when an imaging system including the camera 10 and the client device 20 sets and outputs a pattern and a cutout position of an image in accordance with a condition of a region of interest in a captured image will be described by using the flowchart illustrated in FIG. 22. Steps S106 to S109 and S201 of the flowchart are of the same process content and process flow as those in the first embodiment and the second embodiment, respectively. Further, the process of step S101 to S105, S202, and S203 illustrated in the flowchart of the first embodiment and the second embodiment, respectively, may be added to the process in FIG. 22.

Since the patterns or the like of FIG. 23 to FIG. 28 are the same as those in the first embodiment, the description thereof will be omitted.

Figure 23:
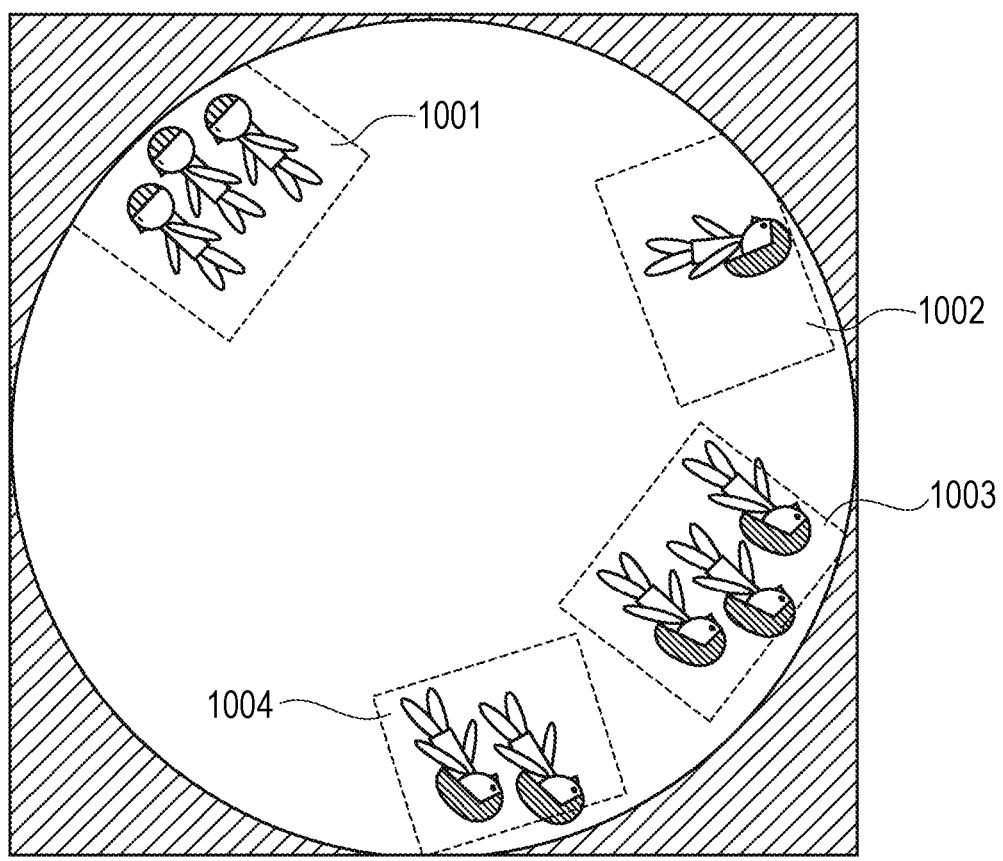
FIG. 23 is a diagram illustrating an example of pattern 3.
Figure 24:
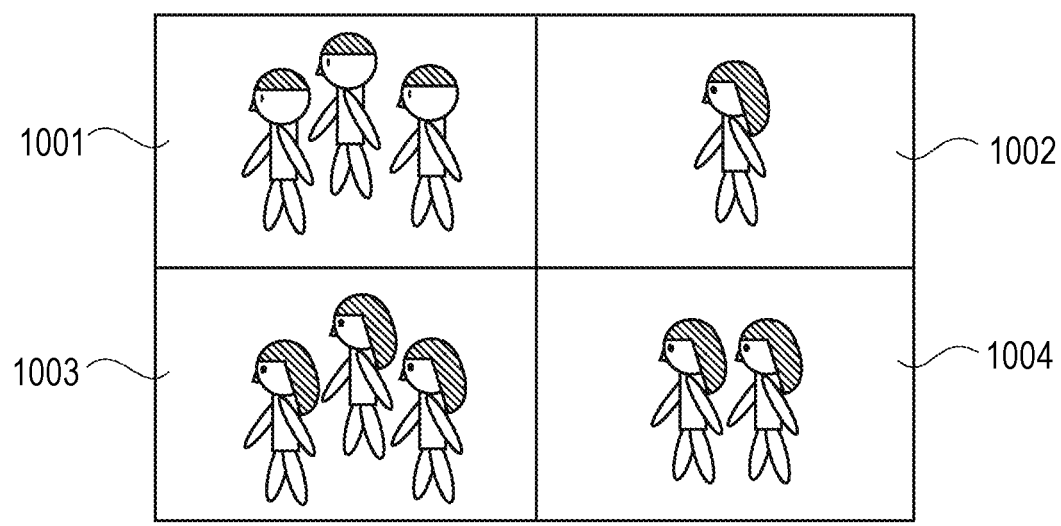
FIG. 24 is a diagram illustrating an example of an example of an image on which a distortion correction process has been performed.

In step S301, the determination unit 103 determines whether or not five or more regions of interest are present. The determination unit 103 proceeds to step S109 if five or more regions of interest are not present (S301, No) and process to step S302 if five or more regions of interest are present (S301, Yes). In step S109, when four, namely, less than five regions of interest are present as illustrated in FIG. 23, the pattern setting unit 104 selects the pattern 3 as illustrated in FIG. 24 and divides the regions in accordance with respective correspondence relationships among a region 1001 to a region 1004. Further, while being five in this example, the number of regions of interest may be any number that exceeds the division number by which a region can be divided by the pattern setting unit 104.

Figure 25:
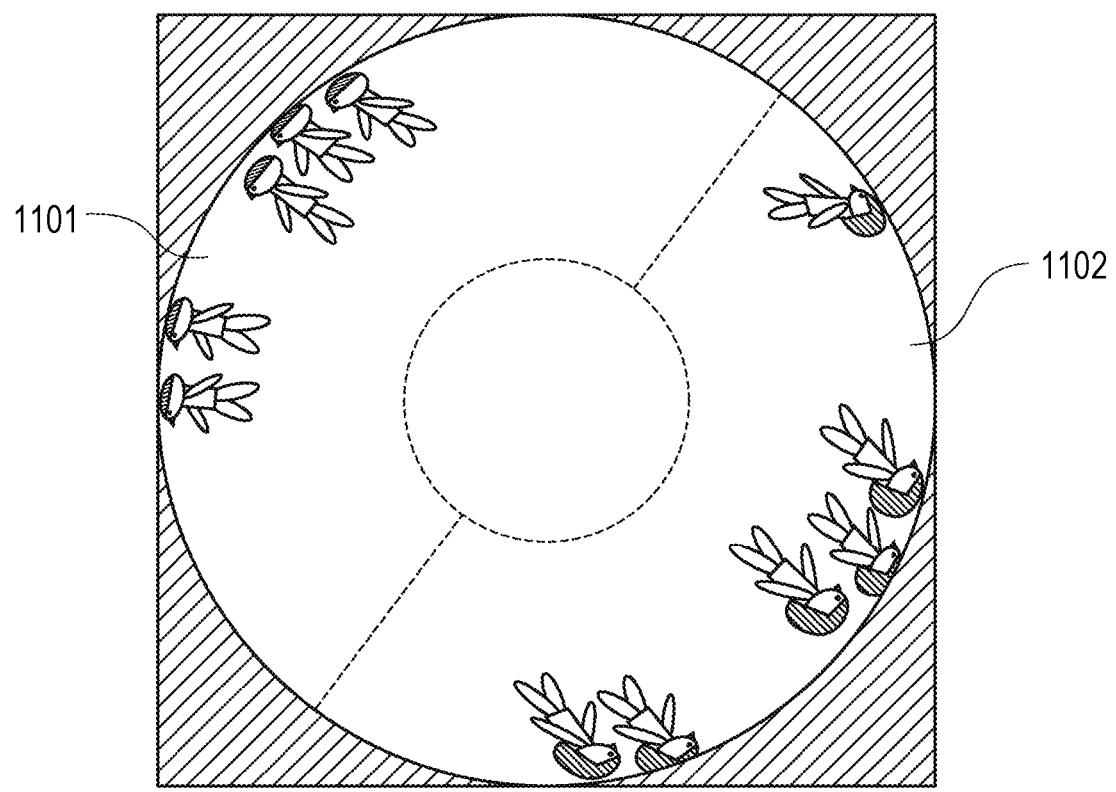
FIG. 25 is a diagram illustrating an example of pattern 2.
Figure 26:
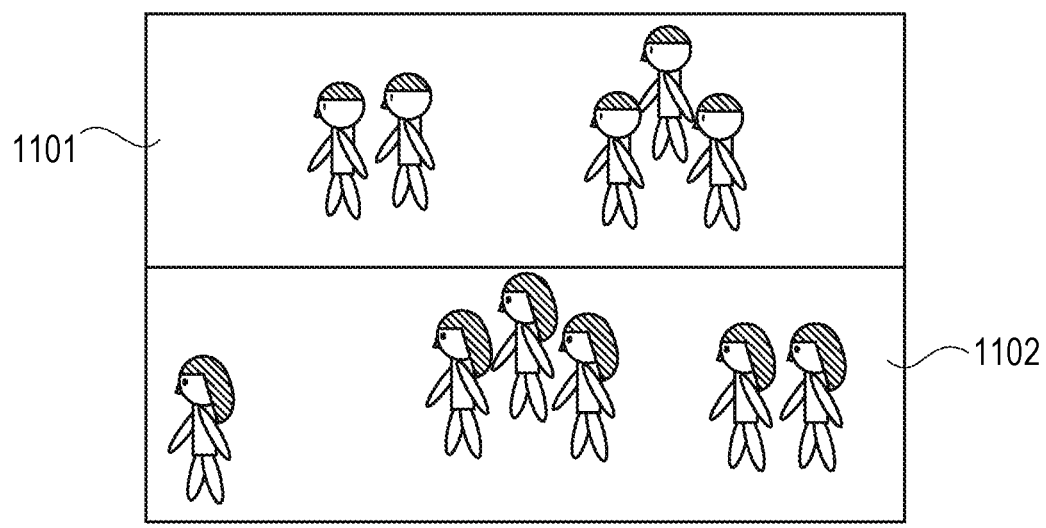
FIG. 26 is a diagram illustrating an example of an image on which a distortion correction process has been performed.

In step S302, the determination unit 103 determines whether or not a priority region is set within a captured image. If no priority region is set within a captured image (S302, No), the determination unit 103 proceeds to step S303 and, if a priority region is set within a captured image (S302, Yes), proceeds to step S306. FIG. 25 is an example when five regions of interest are present, and the determination unit 103 determines a positional relationship of the five positions. Since all the five regions of interest can be output in the case of the pattern 2, the pattern setting unit 104 selects the pattern 2 as illustrated in FIG. 26 in step S303. At this time, the extract position setting unit 105 sets cutout positions at positions where respective regions of interest are not divided. As a result, the image extract unit 106 cuts out a region 1101 and a region 1102 at positions where respective regions of interest are not divided. Further, the distortion correction processing unit 107 performs a distortion correction process.

Figure 27:
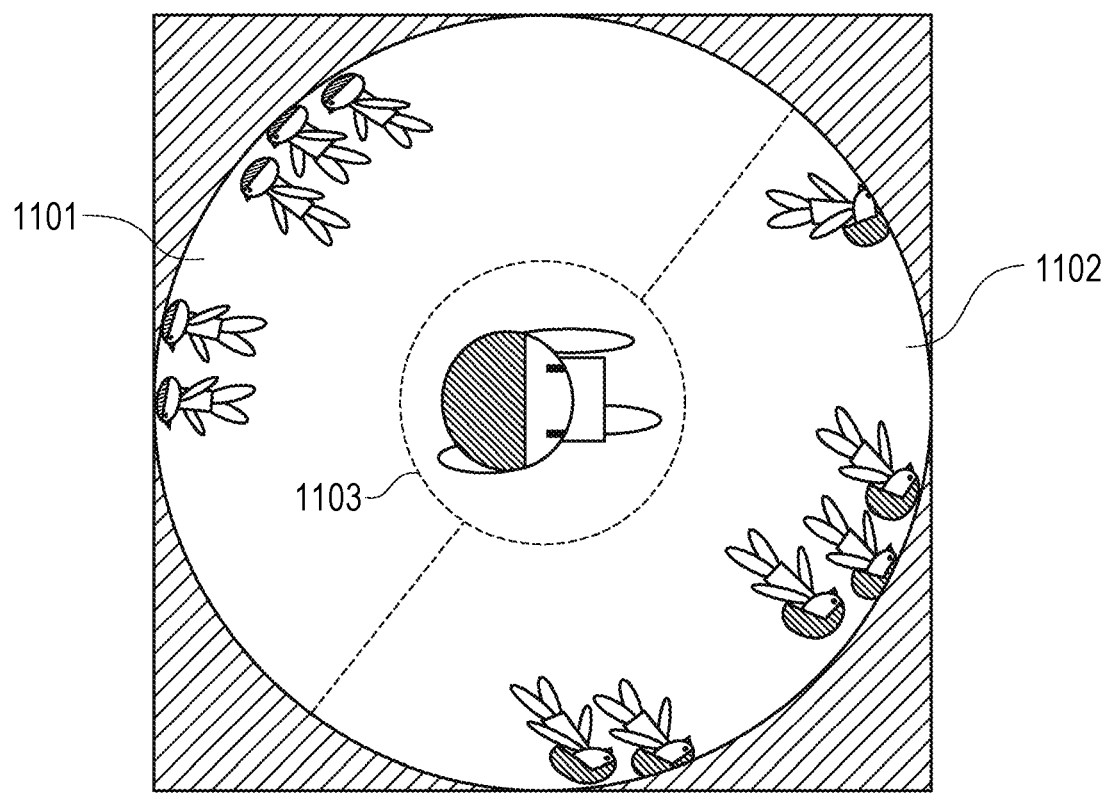
FIG. 27 is a diagram illustrating an example of pattern 3.
Figure 28:
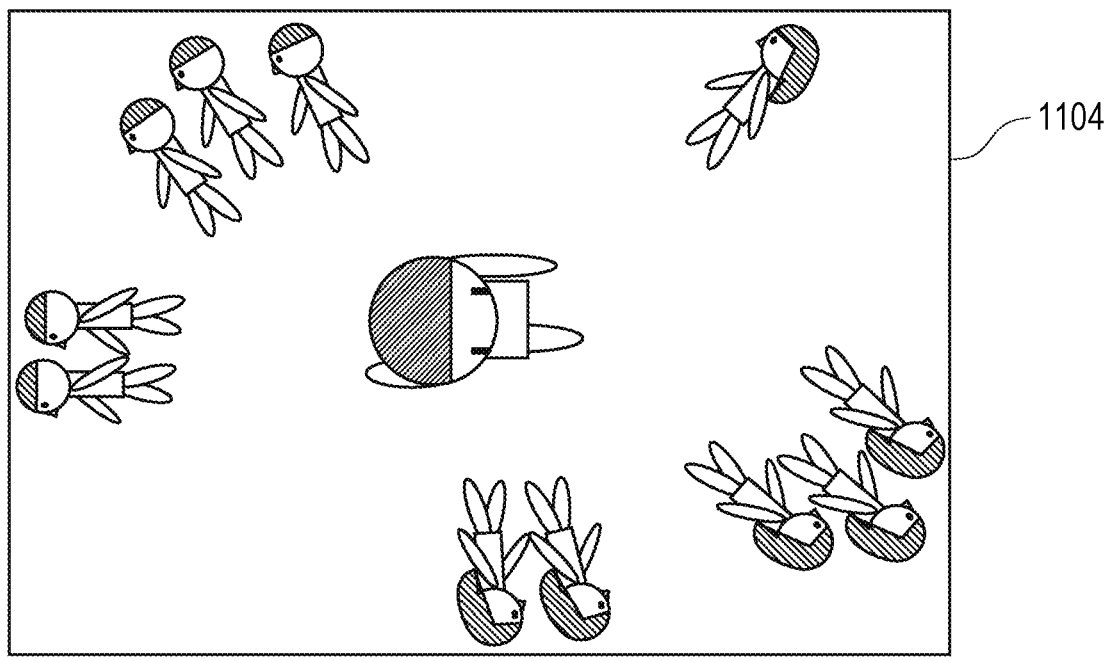
FIG. 28 is a diagram illustrating an example of an image on which a distortion correction process has been performed.

In step S304, the determination unit 103 determines whether or not a subject, which is a region of interest, enters a region 1103 located at the center as illustrated in FIG. 27. The determination unit 103 proceeds to step S305 if a subject enters a region located at the center (S304, Yes) and ends the process of the flowchart in FIG. 22 if no subject enters a region located at the center (S304, No). In step S305, the pattern setting unit 104 may temporarily select the omnidirectional image as a region 1104 that can include all the regions of the region 1101 to the region 1103 of FIG. 27 as illustrated in FIG. 28. Further, when a subject disappears from the region 1103, the pattern setting unit 104 will again set the pattern 2 as illustrated in FIG. 26.

In step S306, when a detection region is set within a captured image, the determination unit 103 determines whether or not there is an object to be detected within the set detection region. The determination unit 103 proceeds to step S307 if there is no object to be detected within the detection region set in advance within the captured image (S306, No) and proceeds to step S308 if there is an object to be detected within the detection region set in advance within the captured image (S306, Yes).

Figure 29:
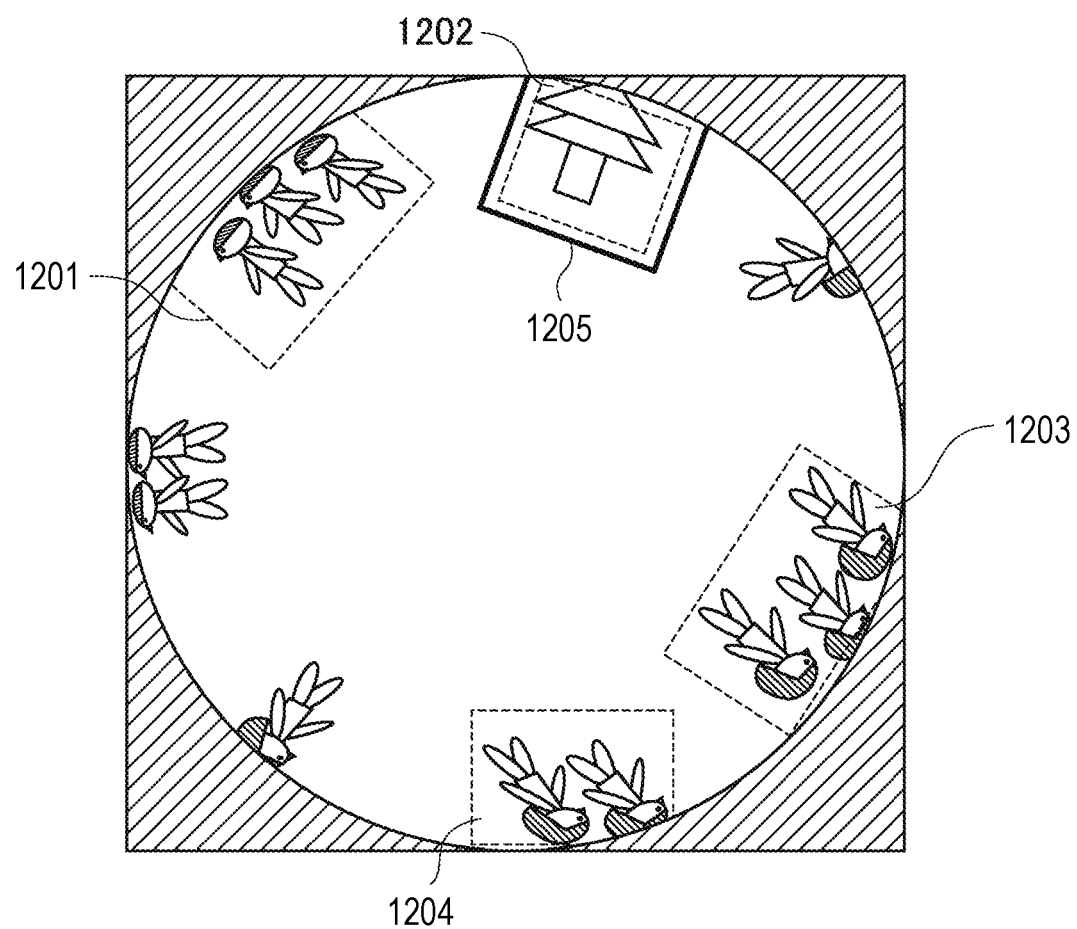
FIG. 29 is a diagram illustrating an example of pattern 3.
Figure 31:
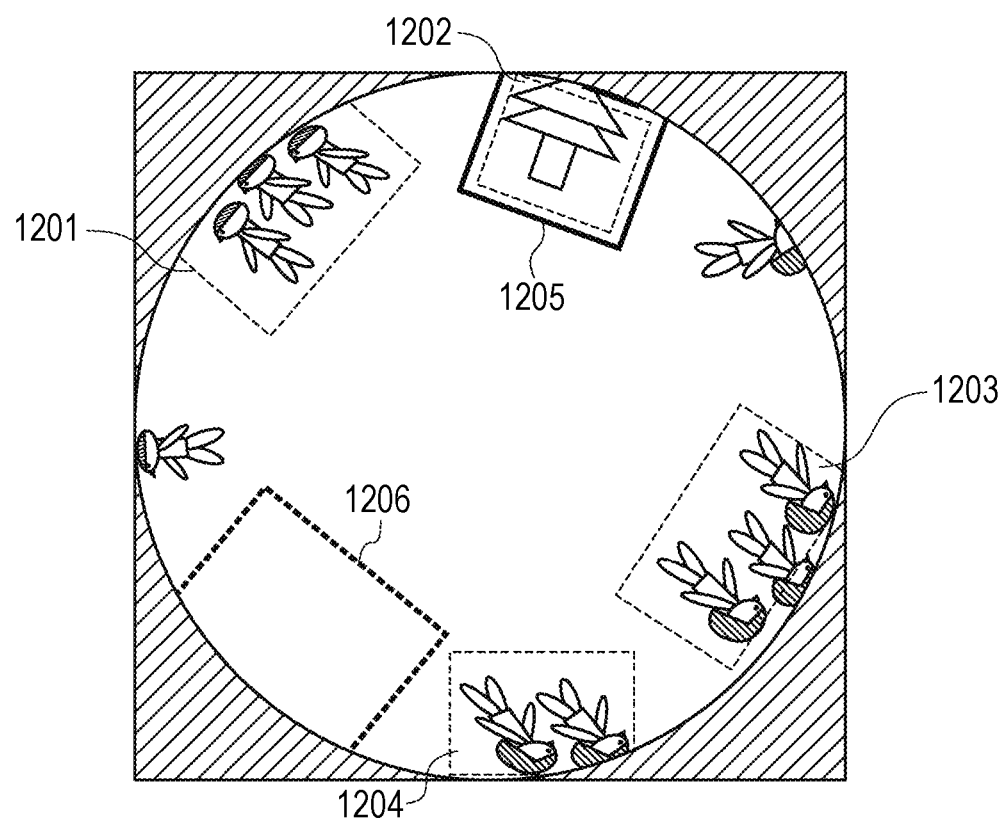
FIG. 31 is a diagram illustrating an example of pattern 3.
Figure 32:
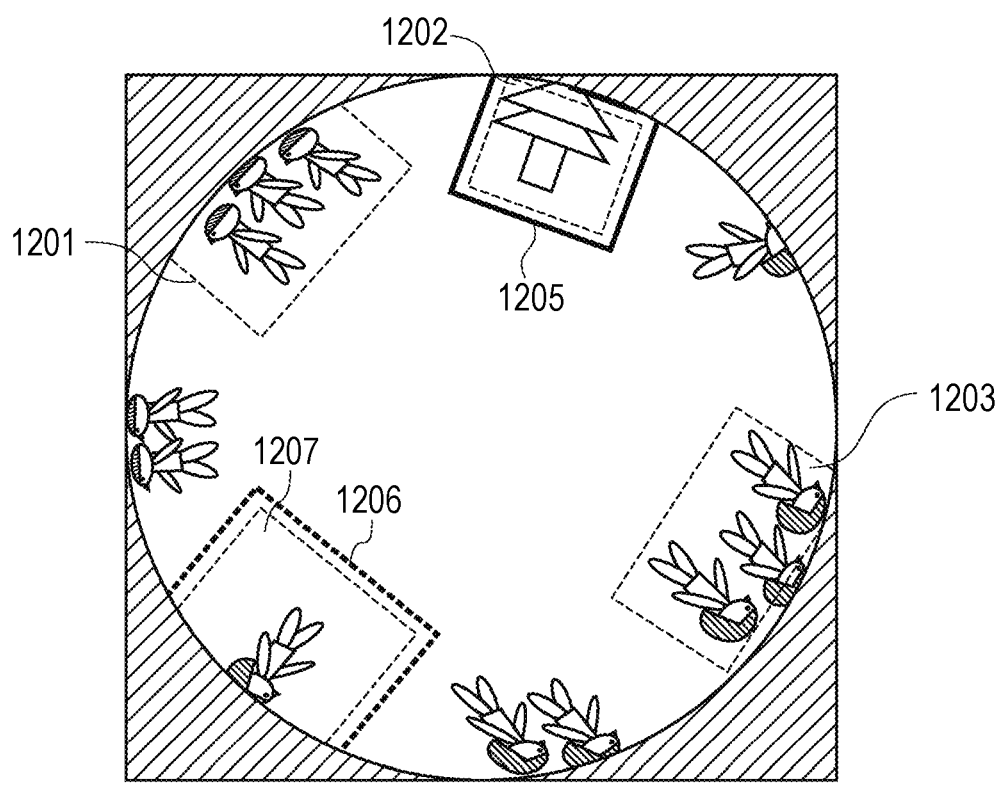
FIG. 32 is a diagram illustrating an example of pattern 3.

FIG. 29 is an example illustrating a case where a priority region is set and no detection region is set. A region 1205 in FIG. 29 is set as a priority region. A priority region is a region where a partial image corresponding to a priority region is cut out and output regardless of whether or not the region is detected as a region of interest. However, a priority region may be set in any region in an image. Further, a plurality of priority regions may be set. FIG. 31 further illustrates an example of a detection region 1206 set in an image. A detection region as used herein is a region used for detecting a particular event such as a person entering a region or disappearing from a region. FIG. 32 represents that a person entering the detection region 1206 is detected.

Figure 33:
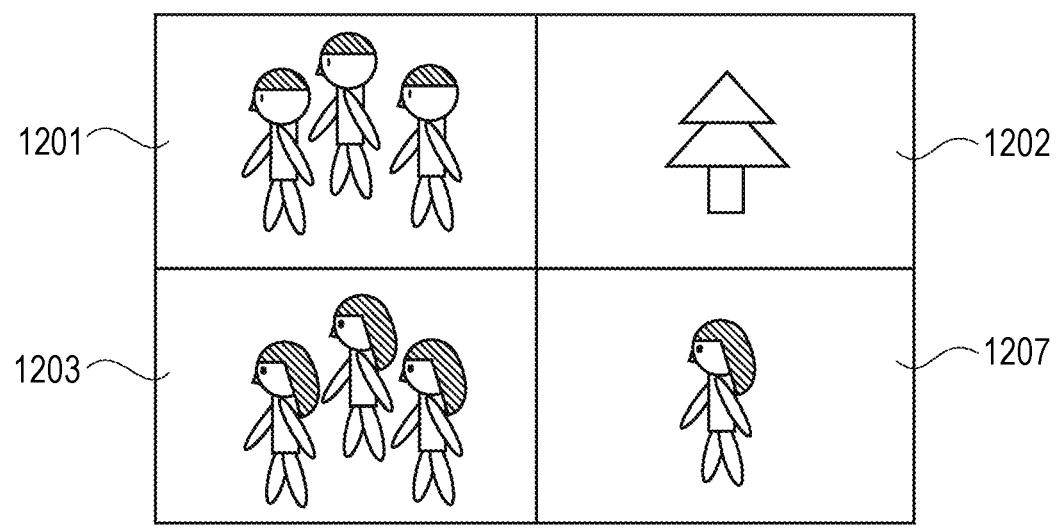
FIG. 33 is a diagram illustrating an example of an image on which a distortion correction process has been performed.

In step S308, the pattern setting unit 104 selects the priority region 1205 (1202) and the detection region 1206 (1207) illustrated in FIG. 32 and further selects a region of high interest out of regions of interest extracted in step S102. The pattern setting unit 104 then sets the pattern 3 to have the image arrangement in FIG. 33. At this time, the regions 1201 and 1203 including a larger number of persons as a region of higher interest are selected out of the regions of interest. The extract position setting unit 105 then sets cutout positions from which partial images corresponding to the priority region 1205, the detection region 1206, and the regions 1201 and 1203 are cut out. As a result, the image extract unit 106 cuts out partial images from the regions 1201, 1203, 1205, and 1206. This process is an example of a process in which, when the priority region is set within the omnidirectional image, the image extract unit 106 prioritizes and cuts out a partial image corresponding to a priority region regardless of whether or not the priority region is detected as a region of interest. Further, this process is also an example of a process in which, when the detection region is set within the omnidirectional image, the image extract unit 106 prioritizes and cuts out a partial image corresponding to a detection region even when the detection region is detected as a region of lower interest than another region of interest. The distortion correction processing unit 107 performs a distortion correction process on respective cut out partial images.

Figure 30:
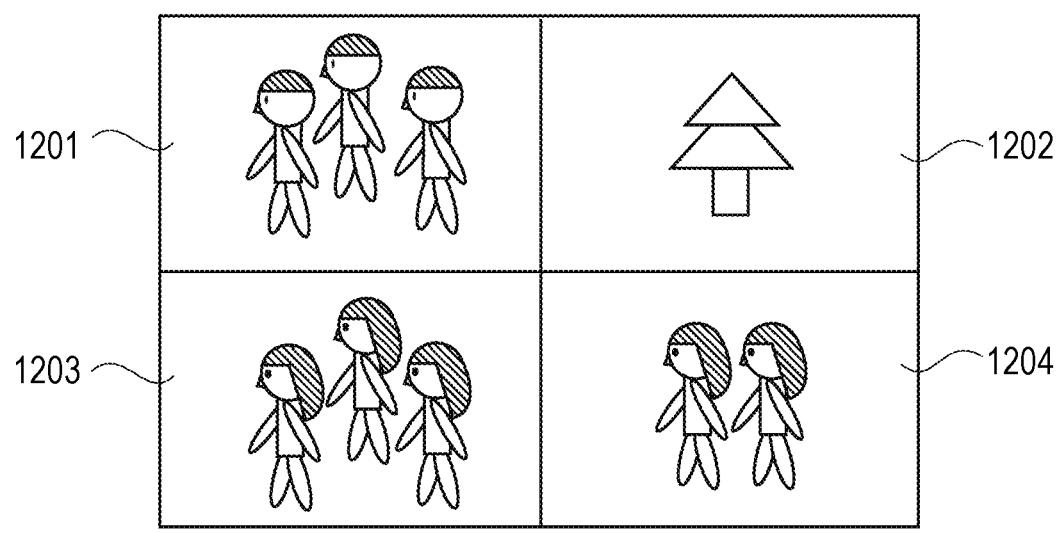
FIG. 30 is a diagram illustrating an example of an image on which a distortion correction process has been performed.

In step S307, when no detection region is set, the priority region 1205 illustrated in FIG. 29 is selected, and the regions of higher interest 1201, 1203, and 1204 are further selected out of the regions of interest extracted in step S102. The pattern setting unit 104 then sets the pattern 3 to have the arrangement in FIG. 30. Since no detection region is set in FIG. 29, the region of interest in FIG. 29 located at the same position as the region 1207 in FIG. 32 is not selected but instead the region of interest 1204 is selected. This is because the region of interest 1204 includes a larger number of persons than the region of interest of FIG. 29 located at the same position as the region 1207 in FIG. 32 and thus is of higher interest. Note that, although there is a region of interest including the same number of persons as the region of interest 1204 on the left side in FIG. 29, the region of interest 1204 is selected because the present embodiment is set to prioritize "female" as a person attribute.

Further, the extract position setting unit 105 sets cutout positions so that partial images corresponding to the selected regions 1201, 1202 (1205), 1203, and 1204 are cut out.

Figure 34:
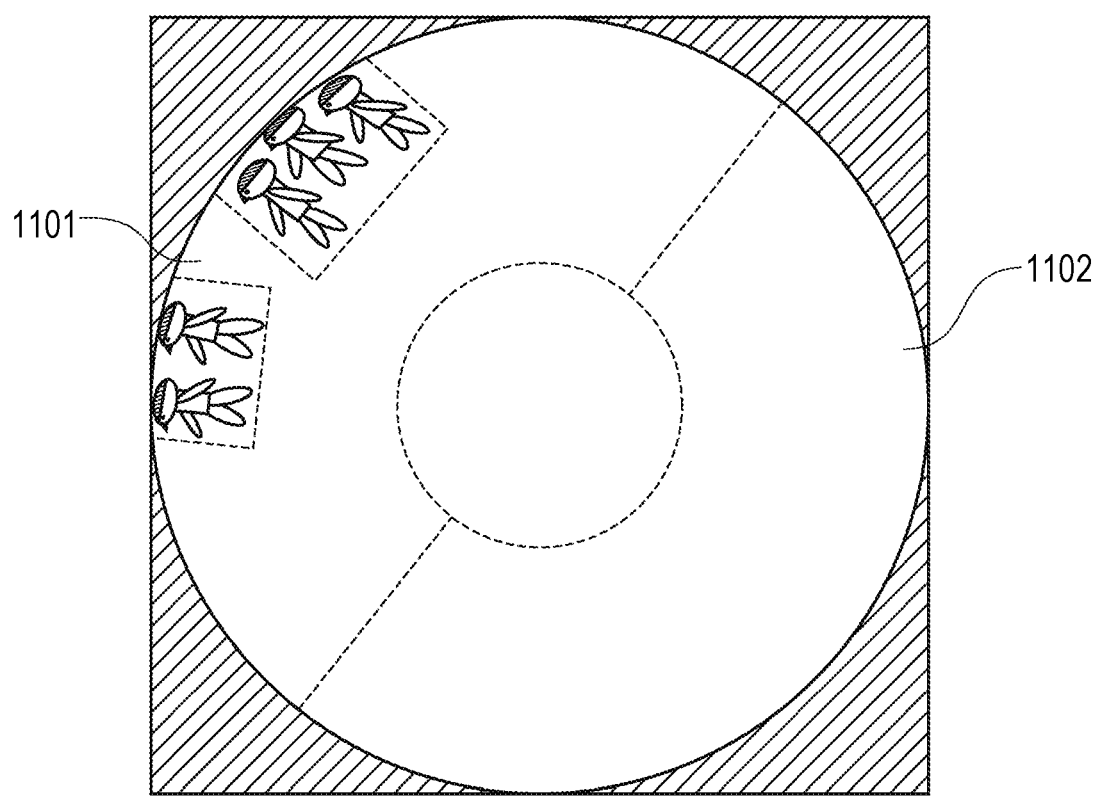
FIG. 34 is a diagram illustrating an example of pattern 1.
Figure 35:
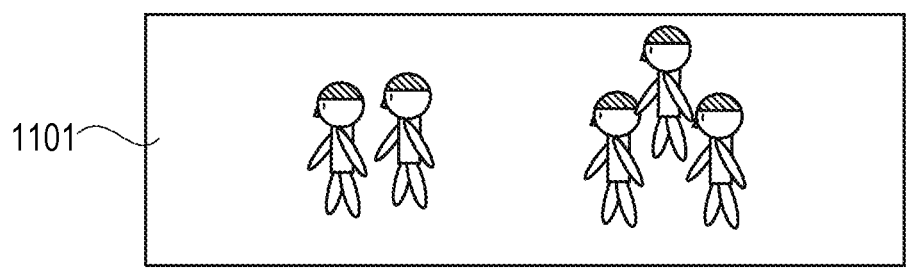
FIG. 35 is a diagram illustrating an example of an image on which a distortion correction process has been performed.

In step S309, the determination unit 103 determines whether or not two regions of interest are detected and the positions of the detected two regions of interest are close to each other. The determination unit 103 determines that the positions of the detected two regions of interest are close to each other when two regions of interest are present within a single semicircle (excluding the center region) of a circle captured image captured by a fisheye camera obtained before a distortion correction. When determining that the two regions of interest are close to each other as illustrated in FIG. 34, the determination unit 103 proceeds to step S106. That is, the pattern 1 is selected, and a semicircle excluding the center region is set as a cutout position. An image after distortion correction will be a single panorama image as illustrated in FIG. 35. On the other hand, when determining that the two regions of interest are not close to each other as illustrated in FIG. 12, the determination unit 103 proceeds to step S108. As a result, a double panorama image as illustrated in FIG. 13 will be displayed.

As described above, according to the process of the present embodiment, it is possible to provide an image suitable for surveillance taking a particular region, an object, and a moving object into consideration in addition to provide the advantages of the first embodiment and the second embodiment. Note that selection of the patterns described in the first to third embodiments can be combined where appropriate.

Other Embodiments

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

For example, in the embodiments described above, the camera described as the image capturing apparatus can be applied to a digital still camera or a digital video camera.

Further, a part or whole of the software configuration described above may be implemented in a device as a hardware configuration.

Further, a graphics processing unit (GPU) instead of a CPU may be used as a hardware configuration.

As described above, according to each embodiment described above, it is possible to output an image on which a cutout process and a distortion correction process that are suitable for a capturing scene or the like are performed in real time without requiring setting by a user.

This application claims the benefit of Japanese Patent Application No. 2017-248013, filed Dec. 25, 2017, and Japanese Patent Application No. 2018-160283, filed Aug. 29, 2018, which are hereby incorporated by reference herein in their entirety.

What is claimed is:

1. An information processing device comprising:
a computer executing instructions that, when executed by the computer, cause the computer to function as:
a receiving unit configured to receive an omnidirectional image captured by an image capturing unit having a fisheye lens;
a determination unit configured to determine a pattern for cutting out a partial image from the omnidirectional image in accordance with:
i) a number of regions of interest obtained from the omnidirectional image; and
ii) an installation position of the image capturing unit;
an extract unit configured to cut out, in accordance with a pattern determined by the determination unit, a partial image including a region of interest from the omnidirectional image;
a correction unit configured to perform a distortion correction process on the partial image cut out by the extract unit; and
an output unit configured to output the partial image on which the distortion correction process has been performed by the correction unit,
wherein the determination unit determines, as the pattern:
in a case where the imaging capturing unit is installed on a ceiling and the number of regions of interest is two, a pattern for cutting out two partial images each including a single region of interest; and
in a case where the imaging capturing unit is installed on a wall and the number of regions of interest is two, a pattern for cutting out one partial image including two regions of interest.

2. The information processing device according to claim 1, wherein in a case where three regions of interest are obtained from the omnidirectional image and one of the three regions of interest is located at the center in the captured image, the determination unit determines a pattern for cutting out a partial image including regions of interest excluding the region of interest located at the center in the captured image.

3. The information processing device according to claim 1, wherein in a case where three regions of interest are obtained from the omnidirectional image, the determination unit determines a pattern for cutting out partial images corresponding to the three regions of interest from the omnidirectional image.

4. The information processing device according to claim 1, wherein in a case where five or more regions of interest are obtained from the omnidirectional image, the determination unit determines a pattern for outputting the omnidirectional image without cutting out a partial image.

5. The information processing device according to claim 1, wherein in a case where five or more regions of interest are detected from the captured image, the determination unit determines a cutout position to a position where each of the regions of interest is not divided and outputs two partial images.

6. The information processing device according to claim 1, wherein in a case where a priority region is set within the omnidirectional image, the extract unit prioritizes and cuts out a partial image corresponding to the priority region regardless of whether or not the priority region is detected as a region of interest.

7. The information processing device according to claim 1, wherein in a case where a detection region is set within the omnidirectional image, the extract unit prioritizes and cuts out a partial image corresponding to the detection region even when the detection region has been detected as a region of interest having a lower interest than another region of interest.

8. The information processing device according to claim 1, wherein the information processing device is an image capturing apparatus.

9. The information processing device according to claim 1, wherein the information processing device is a client device capable of communicating with an image capturing apparatus.

10. A non-transitory storage medium including a program that causes a computer to function as each unit of the information processing device according to claim 1.

11. An information processing method performed by an information processing device, the information processing method comprising:
a capturing step of an image capturing unit capturing an image through a fisheye lens;
a receiving step of receiving an omnidirectional image captured by the capturing step;
a determining step of determining a pattern for cutting out a partial image from the omnidirectional image in accordance with:
i) a number of regions of interest obtained from the omnidirectional image; and
ii) an installation position of the image capturing unit;
a cutout step of, in accordance with a pattern determined by the determining step, cutting out a partial image including a region of interest from the omnidirectional image;
a correction step of performing a distortion correction process on the partial image cut out by the cutout step; and
an output step of outputting the partial image on which the distortion correction process has been performed,
wherein the determining step determines, as the pattern:
in a case where the imaging capturing unit is installed on a ceiling and the number of regions of interest is two, a pattern for cutting out two partial images each including a single region of interest; and
in a case where the imaging capturing unit is installed on a wall and the number of regions of interest is two, a pattern for cutting out one partial image including two regions of interest.

12. The information processing method according to claim 11, wherein in a case where three regions of interest are obtained from the omnidirectional image and one of the three regions of interest is located at the center in the captured image, the determining step determines a pattern for cutting out a partial image including regions of interest excluding the region of interest located at the center in the captured image.

13. The information processing method according to claim 11, wherein in a case where three regions of interest are obtained from the omnidirectional image, the determining step determines a pattern for cutting out partial images corresponding to the three regions of interest from the omnidirectional image.

14. The information processing method according to claim 11, wherein in a case where five or more regions of interest are obtained from the omnidirectional image, the determining step determines a pattern for outputting the omnidirectional image without cutting out a partial image.

15. The information processing method according to claim 11, wherein in a case where five or more regions of interest are detected from the captured image, the determining step determines a cutout position to a position where each of the regions of interest is not divided and outputs two partial images.

16. The information processing method according to claim 11, wherein in a case where a priority region is set within the omnidirectional image, the cutout step prioritizes and cuts out a partial image corresponding to the priority region regardless of whether or not the priority region is detected as a region of interest.

17. The information processing method according to claim 11, wherein in a case where a detection region is set within the omnidirectional image, the cutout step prioritizes and cuts out a partial image corresponding to the detection region even when the detection region has been detected as a region of interest having a lower interest than another region of interest.

* * * * *